(12) United States Patent
Green et al.

(10) Patent No.: US 11,560,163 B2
(45) Date of Patent: Jan. 24, 2023

(54) SYSTEM AND METHOD FOR DETERMINING GRADE AND ACCELERATION DUE TO MOTORING AND BRAKING

(71) Applicant: Thales Canada Inc, Toronto (CA)

(72) Inventors: Alon Green, Toronto (CA); Marco De-Thomasis, Toronto (CA)

(73) Assignee: THALES CANADA INC, Toronto (CA)

( * ) Notice: Subject to any disclaimer, the term of this patent is extended or adjusted under 35 U.S.C. 154(b) by 461 days.

(21) Appl. No.: 16/721,019

(22) Filed: Dec. 19, 2019

(65) Prior Publication Data
US 2020/0198673 A1 Jun. 25, 2020

Related U.S. Application Data

(60) Provisional application No. 62/782,077, filed on Dec. 19, 2018.

(51) Int. Cl.
*B61L 3/00* (2006.01)
*B61L 25/02* (2006.01)
(Continued)

(52) U.S. Cl.
CPC ............ *B61L 3/006* (2013.01); *B61L 25/021* (2013.01); *G01C 9/18* (2013.01); *G01P 15/08* (2013.01)

(58) Field of Classification Search
CPC ...... B61L 3/006; B61L 25/021; B61L 25/023; B61L 25/026; G01C 9/18; G01C 21/16;
(Continued)

(56) References Cited

U.S. PATENT DOCUMENTS

| 4,204,427 A | 5/1980 | Gothe et al. |
| 5,721,378 A | 2/1998 | Furuichi et al. |
| 5,950,952 A | 9/1999 | Koketsu |

(Continued)

FOREIGN PATENT DOCUMENTS

| CN | 203375962 | 1/2014 |
| DE | 4025184 | 7/1992 |

(Continued)

OTHER PUBLICATIONS

Ahmed et al.; Terrain-Based Vehicle Localization Using Low Cost MEMS-IMU Sensors; 2016 IEEE 83rd Vehicular Tech. Conf. (VTC Spring); pp. 1-5; 2016 (Year: 2016).*

(Continued)

*Primary Examiner* — Michael J Zanelli
(74) *Attorney, Agent, or Firm* — Hauptman Ham, LLP

(57) ABSTRACT

A vehicle-position monitoring system includes liquid-capacitive inclinometer sensor, configured to provide a measurement of grade ($\theta_{grade}$) of a surface over which a vehicle travels, and an accelerometer to measure acceleration of the vehicle along a principal axis ($a_x$) of the vehicle along the surface. Direct measurement of the grade ($\theta_{grade}$) provides a position-tracking system with accurate information to extract acceleration due to motoring and braking ($a_{MB}$) from acceleration experienced along the principal axis and track vehicle position without regard to wheel diameter calibration.

20 Claims, 17 Drawing Sheets

(51) Int. Cl.
  *G01C 9/18* (2006.01)
  *G01P 15/08* (2006.01)
(58) Field of Classification Search
  CPC ... G01C 2009/185; G01P 15/08; G01P 15/00; G01P 5/18
  See application file for complete search history.

(56) References Cited

U.S. PATENT DOCUMENTS

| | | |
|---|---|---|
| 6,470,580 B1 | 10/2002 | Ushihara et al. |
| 7,360,424 B2 | 4/2008 | Urano et al. |
| 7,426,788 B2 | 9/2008 | Hasegawa et al. |
| 7,873,458 B2 | 1/2011 | Todd |
| 8,082,777 B2 | 12/2011 | Szelag et al. |
| 8,548,722 B2 | 10/2013 | Puhalla et al. |
| 8,849,556 B2 | 9/2014 | Solbrack et al. |
| 9,409,459 B2 | 8/2016 | Solbrack et al. |
| 2005/0137761 A1 | 6/2005 | Lungu |
| 2010/0152987 A1 | 6/2010 | Gorai |
| 2018/0024563 A1 | 1/2018 | Matsuzaki et al. |
| 2018/0154902 A1 | 6/2018 | Shami |

FOREIGN PATENT DOCUMENTS

| | | |
|---|---|---|
| EP | 0402522 A2 | 12/1990 |
| EP | 2881713 | 6/2015 |
| JP | 63-61919 | 3/1988 |
| WO | WO 00/37889 | 6/2000 |
| WO | WO 2013/004327 | 1/2013 |

OTHER PUBLICATIONS

Palella et al.; Sensor Fusion for Land Vehicle Slope Estimation; Inertial Sensors and Systems 2016; Karlsruhe, Germany; IEEE, 2016 (Year: 2016).*

Terzic, Edin; "Capacitive Fuel Level Sensor Development in Automotive Applications", Swinburne University of Technology; May 1, 2012; pp. 1-265; https://pdfs.semanticscholar.org/2c61/699a74bc5bfaec017d0df5ad54fcfb75f5e2.pdf.

Extended European Search Report issued in corresponding European Application No. 19901172.7, dated Aug. 12, 2022, pp. 1-9, European Patent Office, Munich, Germany.

* cited by examiner

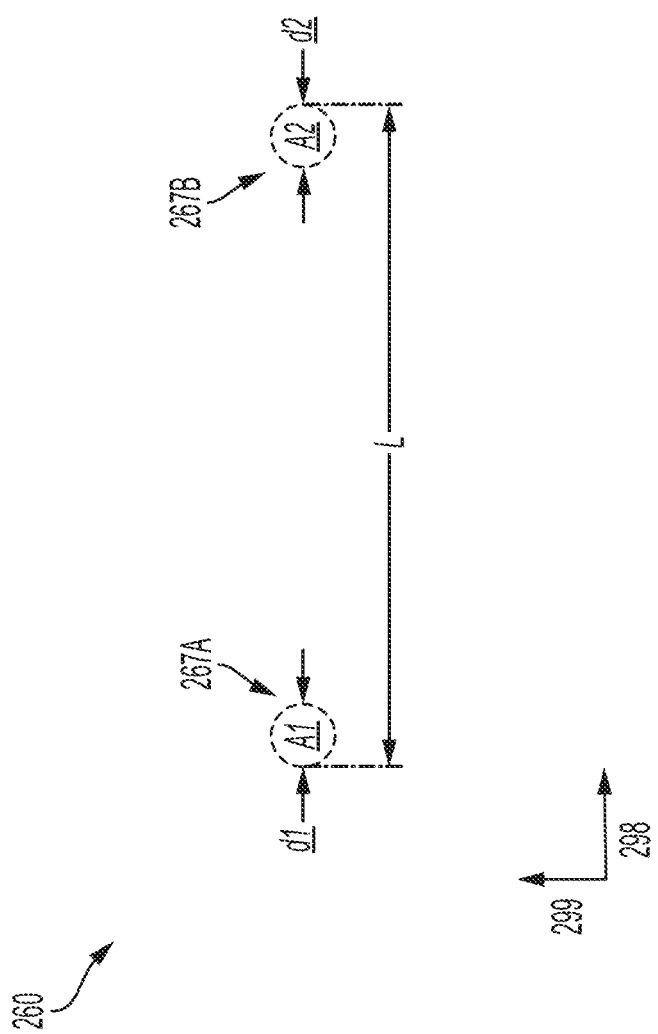

SYSTEM AND METHOD FOR DETERMINING GRADE AND ACCELERATION DUE TO MOTORING AND BRAKING

PRIORITY CLAIM

This application claims the priority of U.S. Patent Application No. 62/782,077, filed Dec. 19, 2018, which is incorporated herein by reference.

BACKGROUND

Safe operation of rail vehicles on tracks involves the coordination of train positions on the tracks to avoid collisions. One method of determining train positions on set of tracks includes monitoring wheel rotation to determine a vehicle position from a known reference point during rail operations. Tracking wheel rotation to determine vehicle position depends on uniform wheel movement against the set of tracks. However, slipping or sliding occurs for some vehicles, especially in wet or icy conditions, leading to errors in vehicle position estimates.

BRIEF DESCRIPTION OF THE DRAWINGS

FIG. 2A-2c are cross-sectional views of a liquid capacitive inclinometer sensor, in accordance with some embodiments.

DETAILED DESCRIPTION

Figure 1:
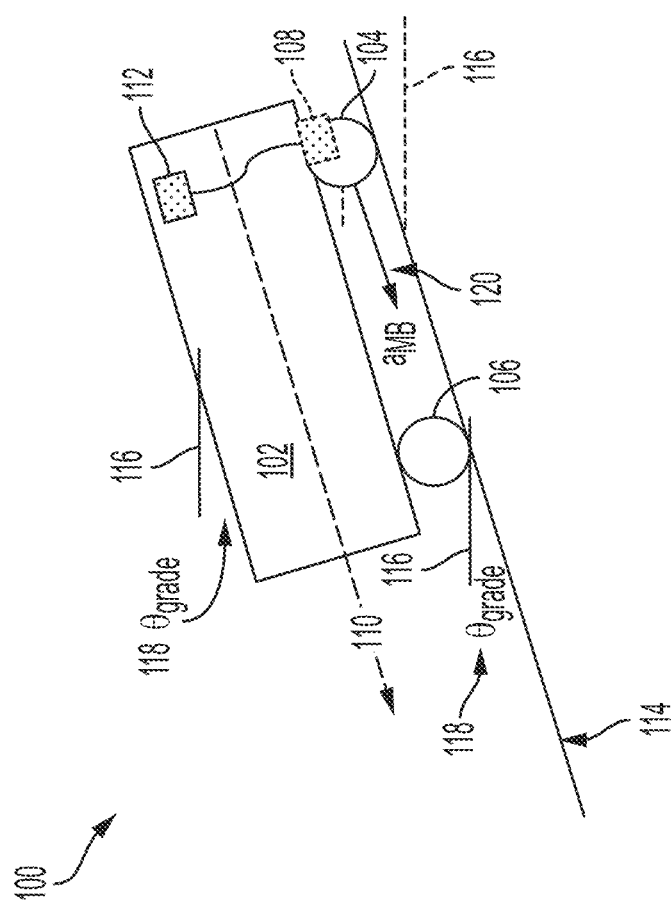
FIG. 1 is a side view of a rail vehicle, in accordance with some embodiments.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure relates to systems and methods for determining the grade angle ($\theta_{grade}$) of a vehicle (a vehicle of interest) and the component of acceleration experienced by the vehicle arising from motoring & braking effort ($a_{MB}$). In the present disclosure, the term vehicle is used to refer to a road vehicle or rail vehicle. The term grade is used to refer to the vertical deflection angle of a vehicle from a horizontal orientation. A positive grade refers to a positive vertical deflection (e.g., climbing) as a vehicle moves along a road or set of rails. A negative grade refers to a negative vertical deflection (e.g., descending) as the vehicle moves along a road or set of rails. The term slope is sometimes used synonymously with the term grade, especially in reference to the vertical deflection of a set of tracks or road or roadbed below the vehicle for which the vertical deflection is being measured.

In the present disclosure, acceleration due to motoring and braking effort ($a_{MB}$) is used to describe the acceleration along the vehicle's primary axis (axis of motion, e.g., along the road or set of tracks) as a result of motoring force and/or braking force applied along this axis. For vehicles on a horizontal road or set of tracks, the acceleration due to motoring and braking effort is perpendicular to acceleration due to gravity (g), and the two accelerations are easily decoupled when monitoring vehicle acceleration. However, for vehicles on a road or set of tracks moving on a sloped road or set of tracks, the acceleration due to gravity and the acceleration due to motoring and braking effort are more difficult to decouple. Small errors in measuring acceleration due to gravity lead to large errors in measuring $a_{MB}$ for a vehicle.

Accurate measurement of $a_{MB}$ is relevant to vehicle position tracking systems (e.g., an odometry system). For example, in some embodiments, a rail vehicle traveling along a set of tracks includes a guidance computer, or a position tracking computer system, which uses sensors mounted on the vehicle to monitor and/or ascertain the position of the vehicle along the set of tracks to assist in providing a traffic controller computer with accurate position information. Accurate position information is used to provide vehicles (single vehicles, or trains (sets of vehicles)) with movement authority for motion along the set of tracks to avoid collisions with other vehicles. Some embodiments of position tracking computer systems include accelerometers and liquid capacitive inclinometer sensors (LCIS) to record vehicle tilt and extract vehicle acceleration due to motoring and braking effort ($a_{MB}$) from a measurement of acceleration along a primary axis ($a_{PA}$) of motion of the vehicle (e.g., forward or backward along the track).

A liquid capacitive inclinometer sensor (LCIS) is a sensor which monitors capacitance of at least one electrode on a side of a liquid-filled vessel. Upon conditions where the liquid-filled vessel tilts, with respect to the ground plane, or a horizontal plane, the height of liquid at the sides of the liquid-filled vessel changes, and the capacitance of the LCIS changes in proportion to the change in height of the liquid against the side of the liquid-filled vessel wall where the electrode is located. Further description of embodiments of LCIS are provided below in the discussion of FIGS. 2A-2C.

Some LCIS commercially available (COTS, commercial off the shelf) for purchase and use are suitable for use in the embodiments described below for the present disclosure. In some embodiments, customized LCIS are suitable for use in an odometry system or a vehicle position tracking system.

Some systems described herein use accelerometers to record vehicle acceleration during rail operations. Various mechanical or solid-state accelerometers are suitable for use in the present disclosure, including mechanical and/or capacitive inclinometers.

Some embodiments of odometry or position tracking systems, whether in the railway industry or the automotive industry, rely on knowing a vehicle's positioning on the guideway/road to determine the grade of the road or the guideway below the vehicle. In some embodiments, a grade of tracks is stored in a guideway map database and when position is established the grade that matches this position is extracted from the database. Alternatively, in some embodiments of odometry or position tracking systems, the grade below a vehicle is estimated from the acceleration measured by a single axis accelerometer with a primary axis aligned along the vehicle's primary axis, the vehicle acceleration calculated based on the speed measured by a wheel speed sensor or tachometer. However, wheel speed sensors are limited to periods where the wheels are rotating: slipping or sliding of the wheels reduces the accuracy of wheel speed or wheel rotation measurements in determining vehicle position. An accelerometer measures the acceleration along the vehicle's primary axis, which has two components: acceleration due to motoring & braking ($a_{MB}$) and the acceleration due to the grade below the vehicle. Determining the acceleration due to motoring & braking includes steps associated with estimates or measurements of the grade below a vehicle.

In the present disclosure, embodiments discussed relate to a method of determining vehicle grade and $a_{MB}$ with a simple car-mounted (e.g., bogie mounted) system independent of wheel-rail adhesion (e.g., independent of slipping or spinning) and unrelated to an accuracy with which wheel diameter is measured or calibrated.

Other techniques of vehicle position monitoring or odometry use a database which correlates vehicle position with a previously-measured and stored value of the track grade at the vehicle position (or, at positions along the road or set of tracks). Upon establishing a vehicle position, the grade corresponding to the vehicle position is extracted from the database and used to estimate acceleration due to vehicle grade. Then, the acceleration due to grade component is subtracted from the acceleration measured by the single axis accelerometer. The remaining acceleration is the acceleration due to motoring and braking.

FIG. 1 is a side view of a vehicle configuration 100, in accordance with some embodiments. Vehicle configuration 100 includes a vehicle 102 with wheels 104 at a back position, and wheels 106 at a front position on the vehicle body. Wheels 104 and wheels 106 are situated on a track 114 (a set of tracks, or rails) Vehicle 102 has a primary axis 110 along the same direction as the tracks 114. A sensor system 108 is mounted in proximity to the wheels 104 at the back position of the vehicle 102. A level position 116 is a horizontal reference line for measuring the slope, or grade, of the track 114, and the vertical deflection of the vehicle 102, or the primary axis 110 of vehicle 102. A position tracking computer system 112 communicatively connected to sensor system 108 records position regarding acceleration along the primary axis 110 and acceleration due to gravity, and the grade 118 ($\theta_{grade}$) of the vehicle 102. The sensor system 108 is mounted on the bogie because the bogie has a large mass, which reduces noise when measuring accelerations, is securely against the track 114 (which provides an accurate measurement of the grade 118, and is low, reducing side to side motion which characterizes portions of vehicle 102 which are at higher elevations above track 114. Acceleration vector 120 is the component of vehicle acceleration due to motoring or braking ($a_{MB}$). $\theta_{grade}$ is the same at each bogie (e.g., wheels 104, and wheels 106) as well as the body of vehicle 102).

Figure 2A:
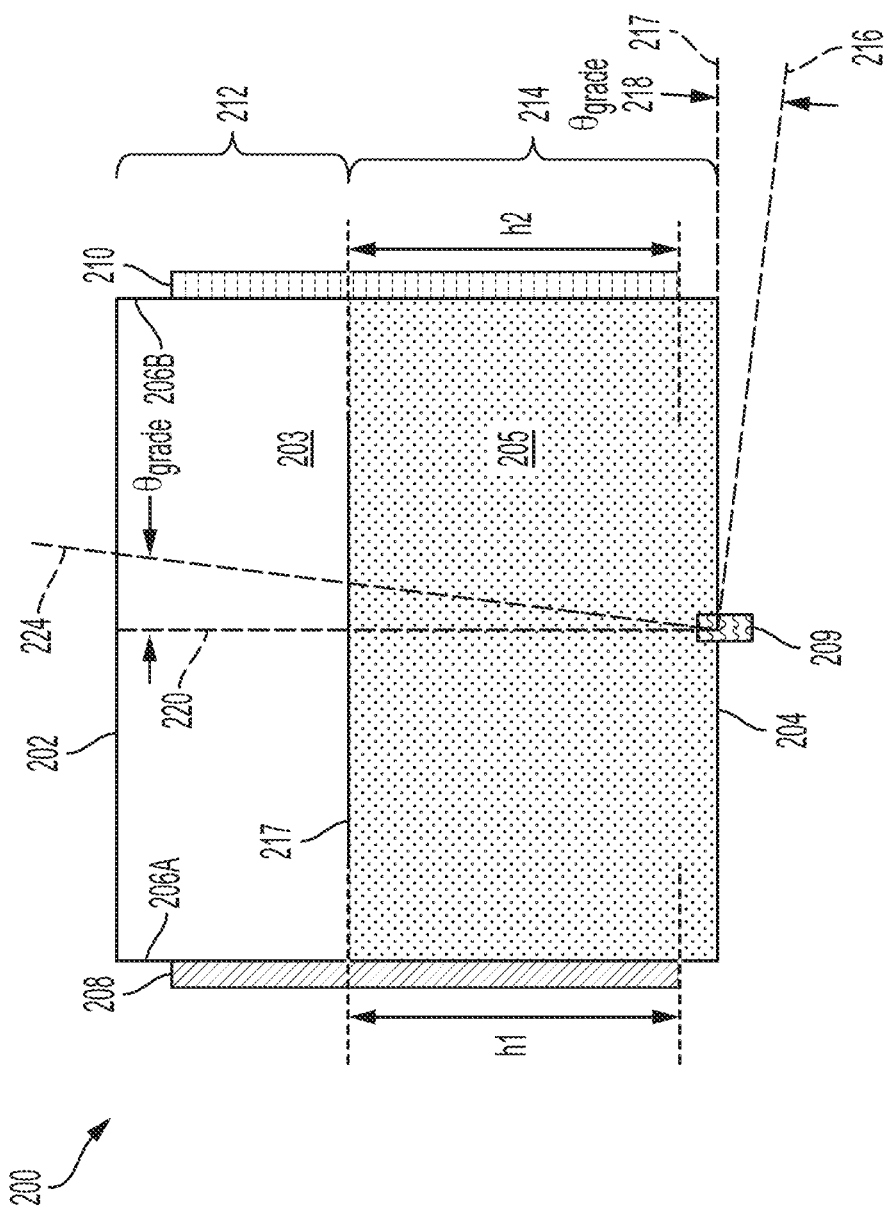
Figure 2B:
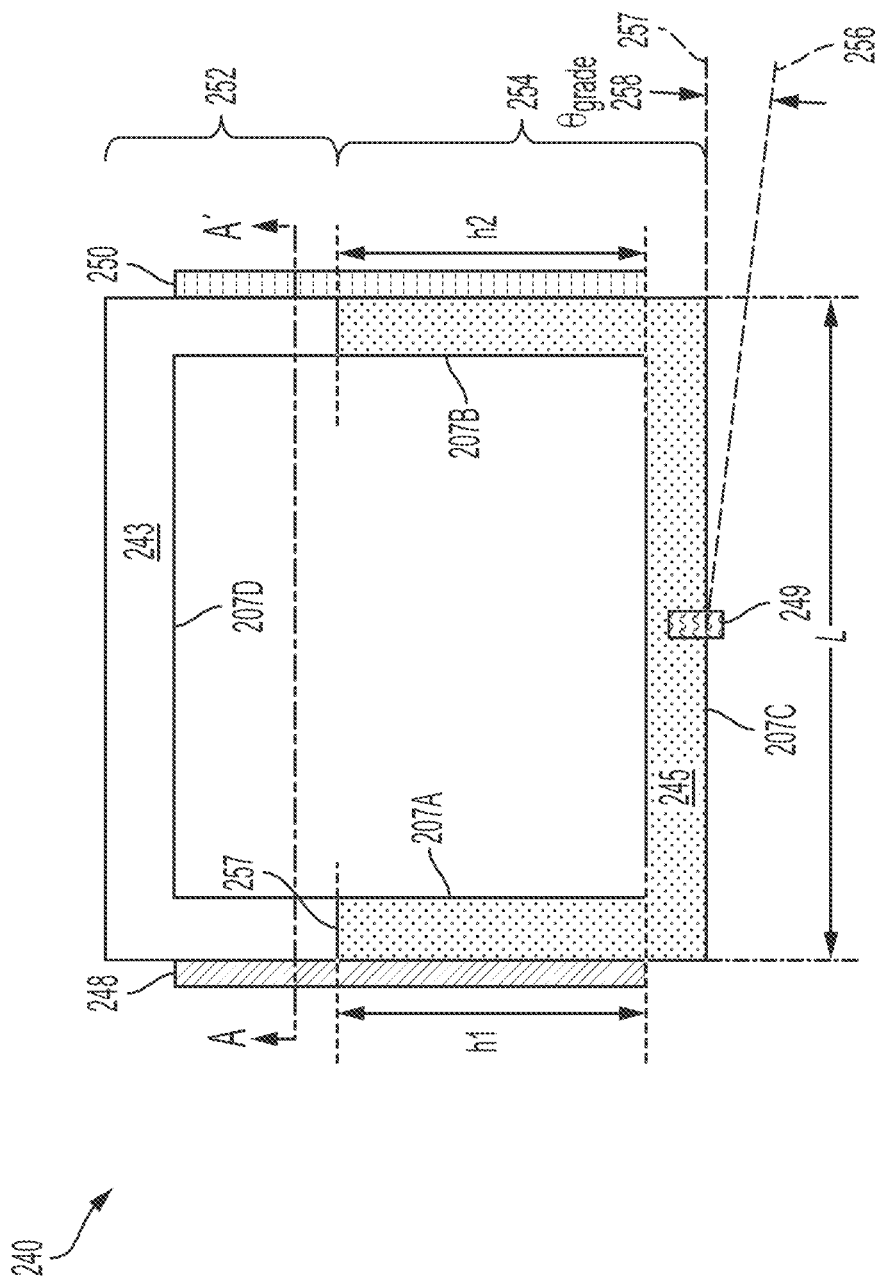

FIG. 2A-2c are cross-sectional views of a liquid capacitive inclinometer sensor (LCIS), in accordance with some embodiments. FIG. 2A is a cross-sectional view of a liquid capacitive inclinometer sensor (LCIS) 200, where LCIS 200 is a cylindrical LCIS, having a top end 202 and a bottom end 204. In some embodiments, top end 202 is closed, and bottom end 204 is closed. In some embodiments, top end 202 is open and bottom end 204 is open (open, meaning, in connection to a reservoir configured to provide overflow capacity for fluid motion into or out of upper section 212 or lower section 214 of LCIS 200. Upper section 212 contains a first fluid 203 and lower section 214 has a second fluid 205. A first electrode 208 is against first sidewall portion 206A, second electrode 210 is against second sidewall portion 206B, and a third electrode 209 is at the bottom end 204 of LCIS 200. Third electrode 209 provides an electrical field which serves as a first capacitor plate of LCIS 200. First electrode 208 and second electrode 210 of LCIS 200 act as second capacitor plates of the LCIS 200. According to the tilt ($\theta_{grade}$ 218) of LCIS 200, the height $h_1$ of the second liquid 205 in proximity to first electrode 208, and the height $h_2$ of second liquid 205 in proximity to second electrode 210, changes. Reference line 220 is a vertical reference line extending up through the center of LCIS 200, and reference line 217 is a horizontal reference line along the bottom end 204. Reference line 220 is perpendicular to reference line 217. Reference line 224 corresponds to reference line 220, and reference line 216 corresponds to reference line 217 when $\theta_{grade}$ 218=0°. When $\theta_{grade} \neq 0°$, reference line 224 corresponds to a vertical reference line, and reference line 216 corresponds to a horizontal reference line (see, e.g., level position 116 of FIG. 1). Interface 217 corresponds to the top surface of second fluid 205. In some embodiments, interface 217 corresponds to an interface between first fluid 203 and second fluid 205. In some embodiments, interface 217 corresponds to an interface between second fluid 205 and air (first fluid 203).

FIG. 2B is a cross-sectional view of a "U"-shaped LCIS 240, in accordance with some embodiments. "U"-shaped LCIS 240 has a set of branches through which fluids flow, but is not a single cylinder. Elements of FIG. 2B which have a same function and/or description have a same identifying numeral, incremented by 40. Upper region 252 contains first fluid 243, and lower region 254 contains second fluid 245. The height $h_1$ of a second fluid 245 in proximity to first electrode 248 according to the grade angle $\theta_{grade}$258 from the horizontal reference line 256. The height $h_2$ of the second fluid 245 in proximity to second electrode 250 according to the grade angle $\theta_{grade}$ 258, or the angle between horizontal reference line 256 and reference line 257 along the bottom branch 207C.

Second fluid 245 fills bottom branch 207C, and lower portions of first branch 207A and second branch 207B. Top branch 207D is filled with a second fluid 243, as is the upper portion of first branch 207A and second branch 207B. In some embodiments, the first fluid is air. In some embodiments, the first fluid is a liquid. In some embodiments, the second fluid 245 is a liquid with an interface 257 with first fluid 243, as described for FIG. 2A. Cross-sectional line A-A' extends through first branch 207A and second branch 207B.

FIG. 2C is a cross-sectional view of a "U"-shaped LCIS 260, in accordance with some embodiments. The cross-sectional view of "U"-shaped LCIS 260 corresponds to the cross-sectional line A-A' of FIG. 2B. First branch 267A has a first cross-sectional area A1, and a first diameter d1, and second branch 267B has a second cross-sectional area A2 and a second diameter d2. A branch separation distance L extends from the position of the first electrode on first branch 267A to the position of the second electrode on second branch 267B. The diameters d1 and d2, and the cross-sectional areas A1 and A2, are selected in accordance with empirically observed response times of the electrodes for "U"-shaped LCIS 260 to transient accelerations along the first axis 298 (e.g., along the length L between electrodes of "U"-shaped LCIS 260). Diameters d1 and d2 are measured along the first axis 298. Second axis 299 is perpendicular to first axis 298, and is associated with motion of the vehicle from side to side, rather than the tilt of a vehicle front end up and down according to the grade, or grade angle ($\theta_{grade}$) of the surface over which the vehicle is moving, or on which the vehicle is situated.

Figure 2D:
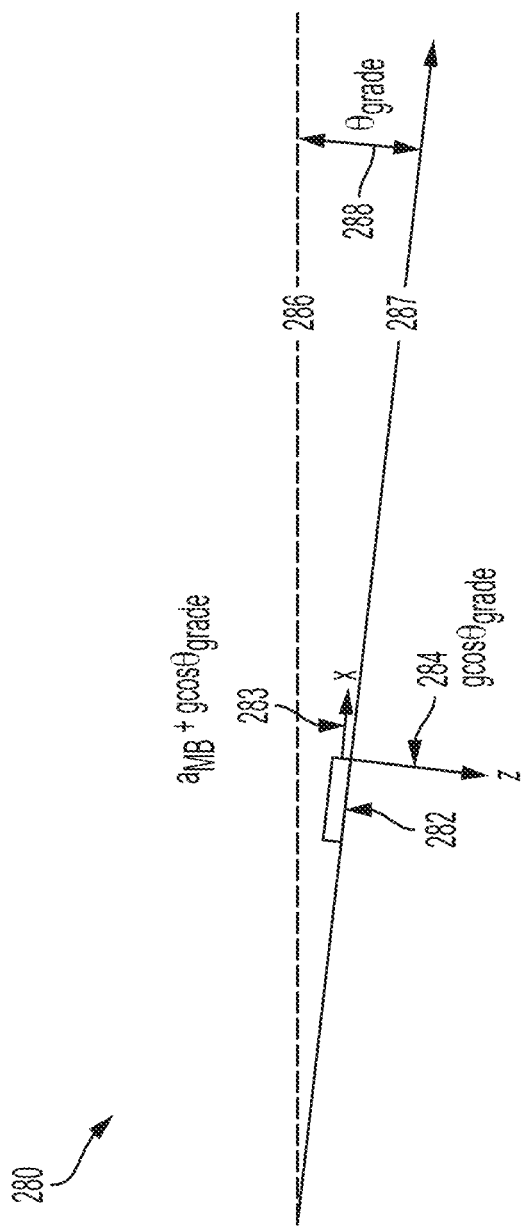
FIG. 2D is a schematic view of a dual-axis accelerometer, in accordance with some embodiments.

FIG. 2D is a schematic view of a dual-axis accelerometer system 280, in accordance with some embodiments. Dual-axis accelerometer system 280 includes a dual axis accelerometer 282 mounted to a car, or bogie (not shown). Dual-axis accelerometer 282 is oriented such that the $a_{PA}$ is measured, with the dual-axis accelerometer 282 being at a grade 288 with respect to the horizontal reference line 286 and the principal axis 287 of the dual axis accelerometer 282. Dual axis accelerometer 282 is configured to measure a first acceleration $a_x$ 283 along the principal axis 287, and a second acceleration 284 ($a_z$) perpendicular to the first acceleration $a_x$, where $a_x = a_{MB} + g \cos(\theta_{grade})$ and $a_z = g \cos(\theta_{grade})$ for dual axis accelerator system 280.

A dual-axis accelerometer system 280 is poorly suited to use for separating $a_{MB}$ from acceleration along the primary axis of the vehicle because of lack of sensitivity in measuring the vertical acceleration. When subtracting a vertical acceleration movement ($a_z$) from the acceleration due to gravity (g), small errors in measuring $a_z$ manifest as large errors in the change in $a_z$ with changes in $\theta_{grade}$ for the system. Rather than calculate $\theta_{grade}$ from the vertical component of acceleration as measured by a dual axis accelerometer, the present disclosure describes a system wherein an LCIS is used to directly measure the grade of a vehicle, or the tracks below the vehicle.

A dual-axis accelerometer system as described in the present disclosure uses a single dual axis accelerometer aligned along the principal axis of the vehicle on the vehicle's wheel/axle or bogie (in the case of rail vehicle). The measured acceleration along the x axis and the z axis are depicted in Equations (1) and (2):

$$a_x = g \sin(\theta_{grade}) - a_{MB} \qquad \text{Equation (1),}$$

$$\text{and } a_z = g \cos(\theta_{grade}) \qquad \text{Equation (2),}$$

the grade ($\theta_{grade}$) is determined as depicted in Equation (3):

$$\theta_{grade} = \cos^{-1}(a_z/g) \qquad \text{Equation (3)}$$

and the acceleration due to motoring and braking ($a_{MB}$) is determined as depicted in the Equation below.

$$a_{MB} = g \sin(\theta_{grade}) - a_x \qquad \text{Equation (4).}$$

Measuring a grade using a dual-axis accelerometer to determine $a_x$ and $a_z$ is less effective at determining the grade of a track because of imprecision in measuring vertical accelerations. Accelerometers are sensitive to noise, and noise in the measured accelerations, combined with the granularity of the calculated grade (e.g., the ratio $a_z/g$ is close to 1). For example, a grade of 1° results in a calculated ratio $a_z/g$ of approximately 0.99985, and a grade of 2° results in a calculated ratio $a_z/g$ of approximately 0.99939. Small measurement errors, especially errors arising from noise, when determining $a_z$ result in large grade measurement errors.

Figure 3A:
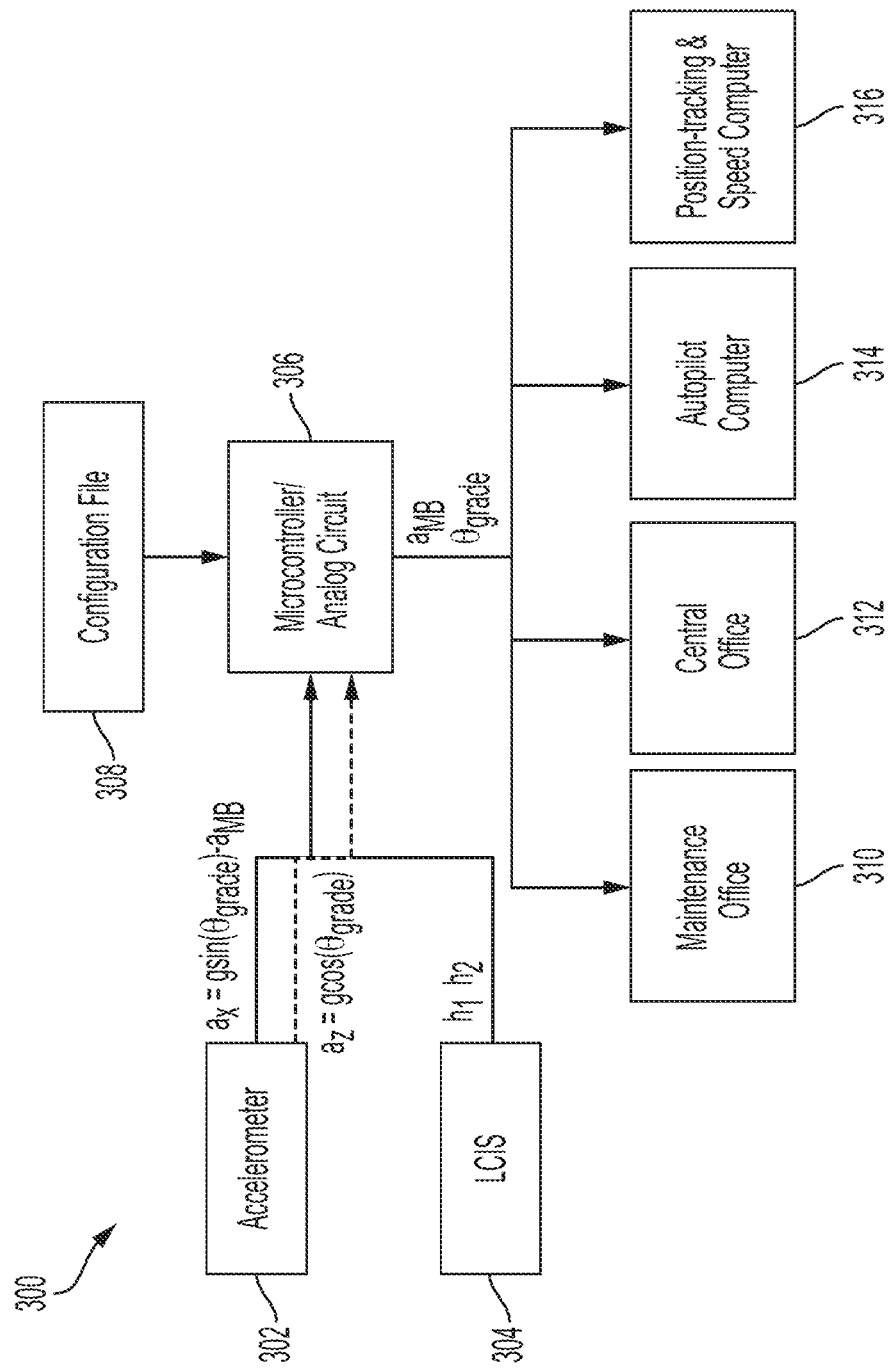
FIGS. 3A-3C are block diagrams of a position-tracking system architecture, in accordance with some embodiments.
Figure 3B:
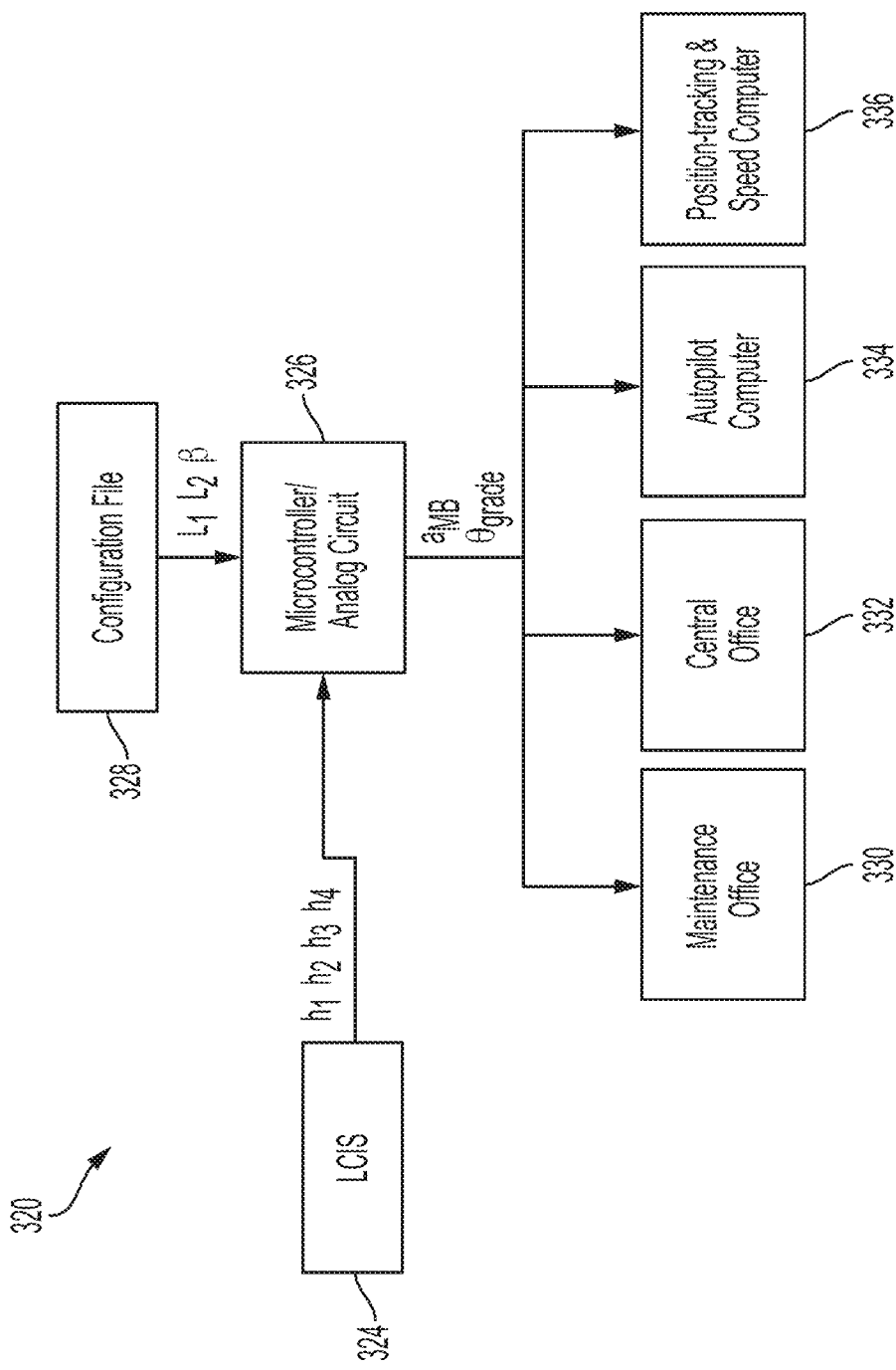
Figure 3C:
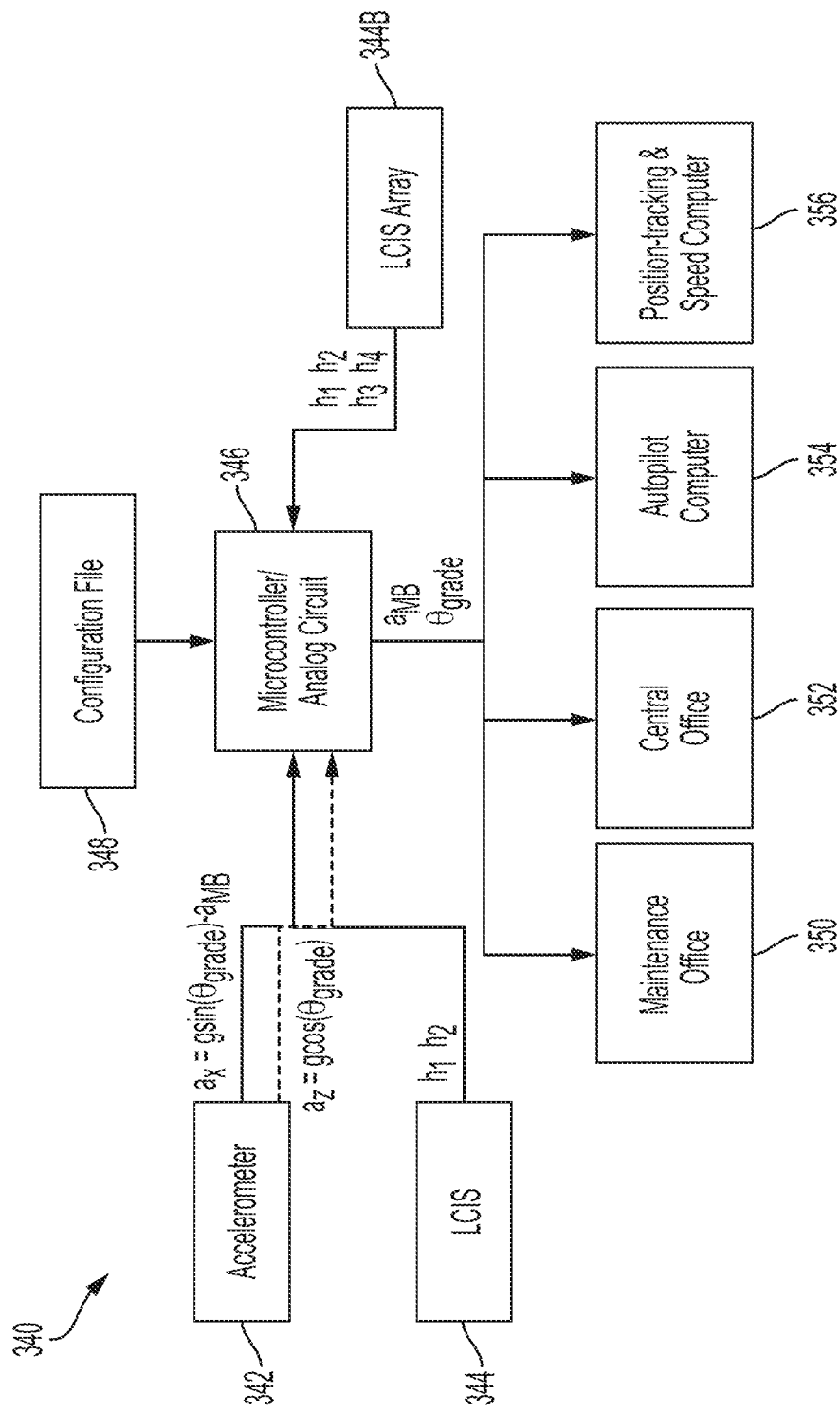

FIGS. 3A-3C are block diagrams of a position-tracking system architecture, in accordance with some embodiments.

FIG. 3A is a block diagram of first system architecture 300, in accordance with some embodiments. First system architecture 300 includes an accelerometer component 302 and an LCIS component 304, communicatively coupled to a microcontroller/analog circuit 306. First system architecture 300 further includes a configuration file 308 which is read by and/or written to by microcontroller/analog circuit 306 in order to perform odometry/position monitoring for vehicles on a track. Results of odometry/position evaluation of the vehicle on a track are reported by the microcontroller/analog circuit 306 to at least one of a maintenance office 310, a central office 312 for movement authority of the vehicle being monitored, an autopilot computer 314 which regulates movement of the vehicle being monitored during unattended train operation within the territory regulated by the central office 312, and/or a position-tracking & speed computer 316 on the vehicle to regulate vehicle safety operations of the vehicle (e.g., avoiding collisions, and so forth, based on the monitored position of the vehicle on the tracks). The accelerometer component 302 is configured to identify the component of $a_{MB}$ along the principal axis of the vehicle ($a_x = g \sin(\theta_{grade}) - a_{MB}$). In embodiments of the first system architecture 300 having a dual-axis accelerometer, the accelerometer is also configured to provide a vertical component of acceleration, $a_z = g \cos(\theta_{grade})$. The LCIS 304 is configured to provide electrical data corresponding to the height of the liquid against each electrode ($h_1$ and $h_2$, where the LCIS is aligned with the principal axis of the vehicle), to directly measure $\theta_{grade}$ during rail operation. For further discussion of a system architecture having an accelerometer and an LCIS, see hardware configurations for position tracking systems in FIGS. 4-7, presented below.

Figure 8A:
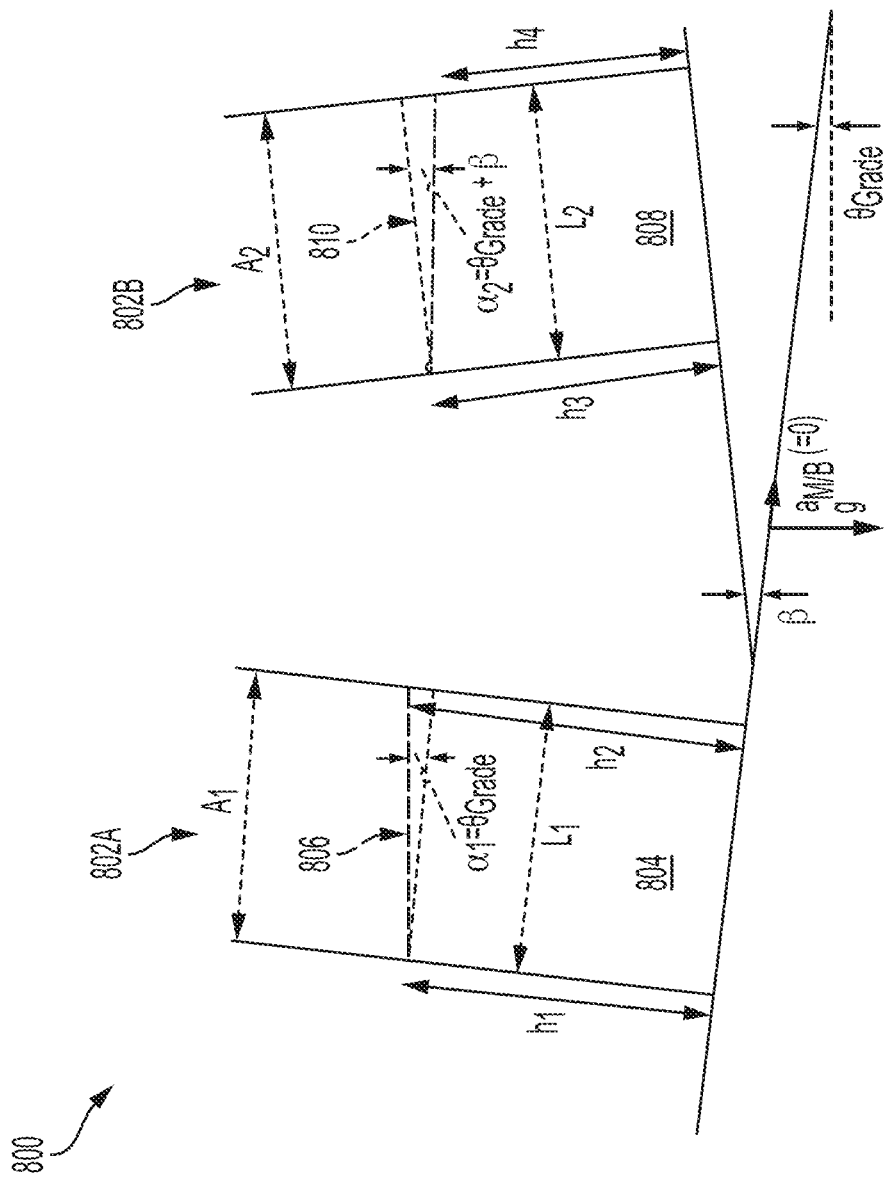
FIGS. 8A-8B are side views of a position-tracking system, in accordance with some embodiments.
Figure 8B:
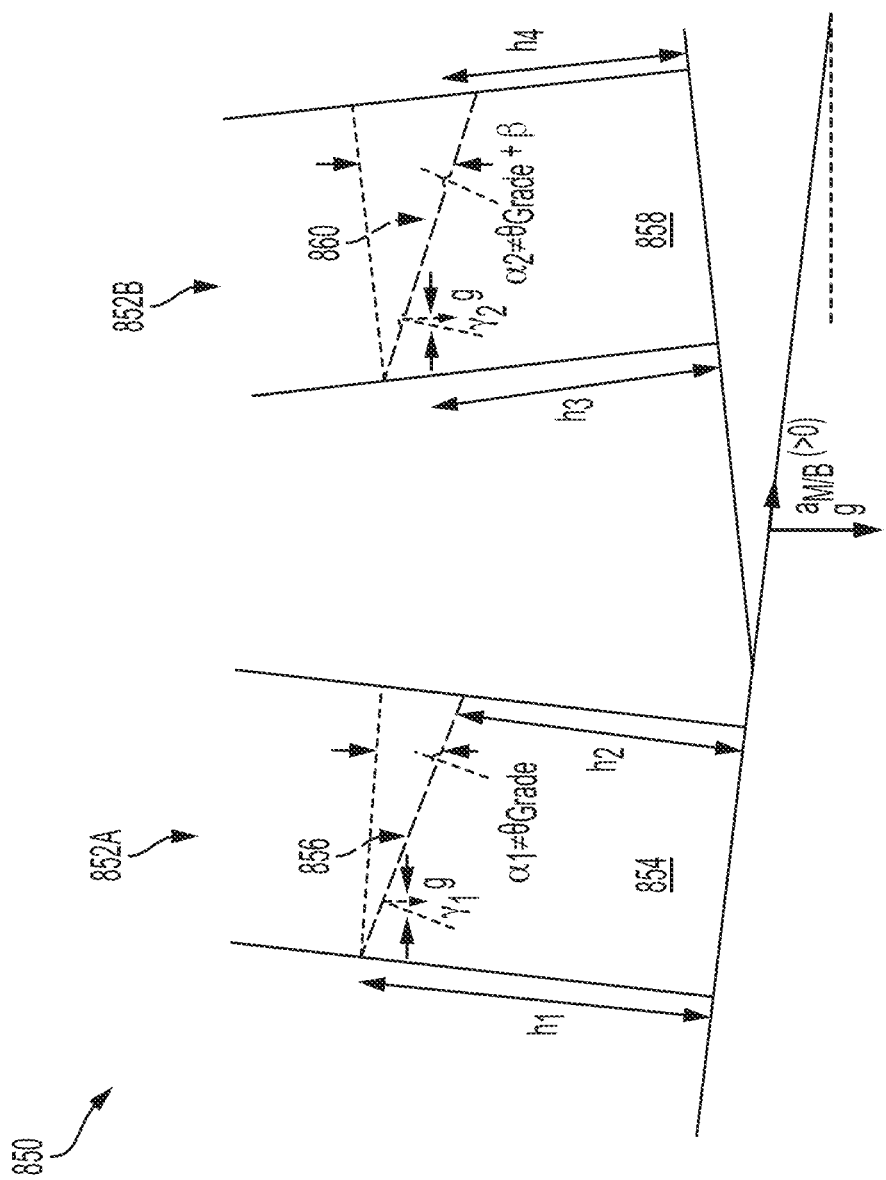

FIG. 3B is a block diagram of a second system architecture 320, in accordance with some embodiments. Components of second system architecture 320 which have a same description or function as the first system architecture 300 have a same identifying numeral, incremented by 20. In second system architecture 320, LCIS component 324 is a dual-LCIS component for measuring $a_{MB}$ $\theta_{grade}$ for a vehicle. For further discussion of LCIS component 324, see the discussion of FIGS. 8A and 8B, presented below. Configuration file 328 includes length measurements $L_1$ and $L_2$ between the electrodes of the individual LCIS in the LCIS component. Further, LCIS component 324 is configured to transmit four height measurements, as described below in FIGS. 8A-8B, of the LCIS component liquid against measurement electrodes/capacitor plates of the LCIS component 324.

FIG. 3C is a block diagram of a third system architecture 340, in accordance with some embodiments. Components of third system architecture 340 which have a same description or function as the first system architecture have a same identifying numeral, incremented by 40. Third system architecture 340 is a system which includes both an accelerometer component 342 and LCIS components 344A and 344B. In third system architecture 340, a combination of accelerometer and LCIS component measurements provide greater accuracy, and/or redundancy, when measuring $\theta_{grade}$ and $a_{MB}$ as compared to first system architecture 300 and second system architecture 320. LCIS component 344A is configured to transmit measured values of $h_1$ and $h_2$ for the first LCIS component, and measured values of $H_1$, $h_2$, $h_3$, and $h_4$ of individual LCIS units in the second LCIS component 344B. Microcontroller/analog circuit 346 is configured to calculate and transmit values of $a_{MB}$ and $\theta_{grade}$ to at least one of maintenance office 350, central office 352, autopilot computer 354, and/or position-tracking & speed computer 356, in order to at least monitor vehicle position and/or provide movement authority to the vehicle during rail operations.

Figure 3D:
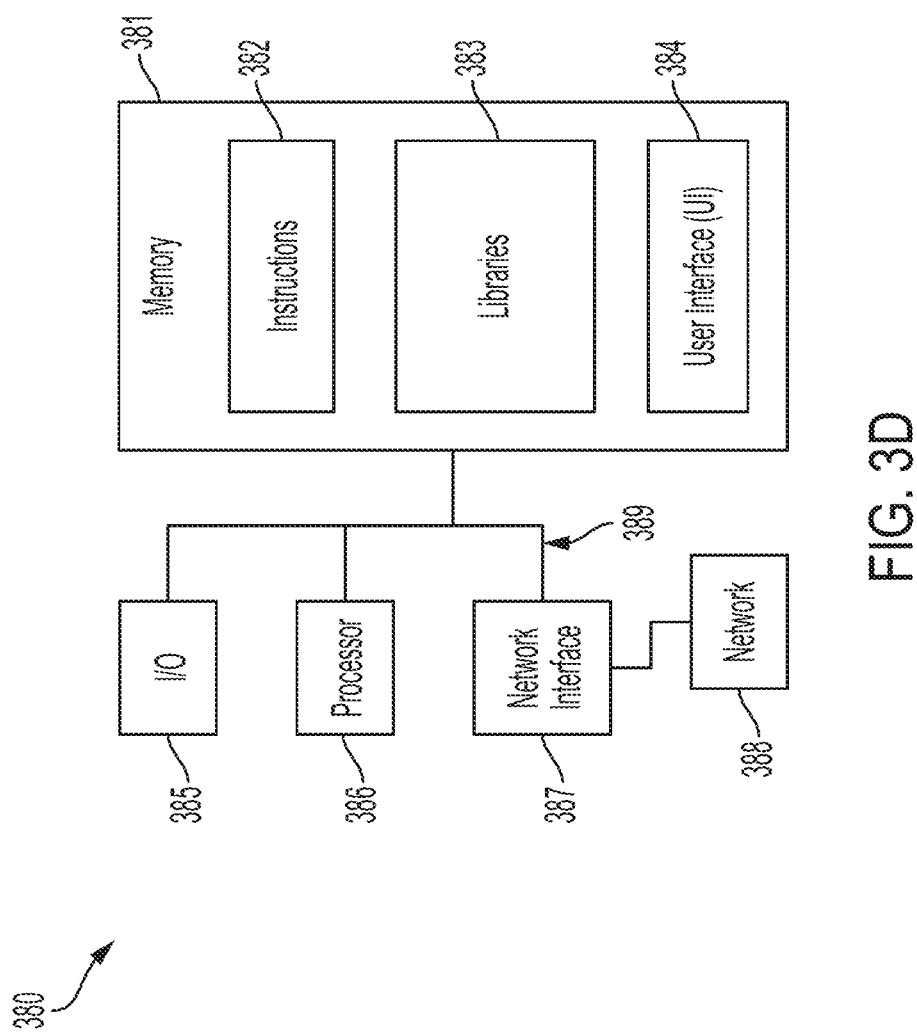
FIG. 3D is a schematic diagram of an acceleration measuring computer system (system) 380, in accordance with some embodiments.

FIG. 3D is a schematic diagram of an acceleration measuring computer system (system) 380, in accordance with some embodiments. In some embodiments, system 380 is a general purpose computing device including a hardware processor 386 and a non-transitory, computer-readable storage medium (storage medium) 381. Storage medium 381, amongst other things, is encoded with, i.e., stores, computer program code 382, i.e., a set of computer-executable instructions (instructions). Execution of instructions 382 by hardware processor 386 represents (at least in part) a vehicle position tracking computer system which implements a portion or all of, e.g., the methods described herein in accordance with one or more (hereinafter, the noted processes and/or methods).

Hardware processor 386 is electrically coupled to computer-readable storage medium 381 via a bus 389. Hardware processor 386 is also electrically coupled to an I/O interface 385 by bus 389. A network interface 387 is also electrically connected to hardware processor 386 via bus 389. Network interface 387 is connected to a network 388, so that hardware processor 386 and computer-readable storage medium 381 are capable of connecting to external elements via network 388. Hardware processor 386 is configured to execute computer program code 382 encoded in computer-readable storage medium 381 in order to cause system 380 to be usable for performing a portion or all of the noted processes and/or methods. In one or more embodiments, hardware processor 386 is a central processing unit (CPU), a multi-processor, a distributed processing system, an application specific integrated circuit (ASIC), and/or a suitable processing unit.

In one or more embodiments, computer-readable storage medium 381 is an electronic, magnetic, optical, electromagnetic, infrared, and/or a semiconductor system (or apparatus or device). For example, computer-readable storage medium 381 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 381 includes a compact disk-read only memory (CD-ROM), a compact disk-read/write (CD-R/W), and/or a digital video disc (DVD).

In one or more embodiments, storage medium 381 stores computer program code 382 configured to cause system 380 (where such execution represents (at least in part) the measurement of vehicle tilt to determine the grade of tracks below the vehicle, and comparison of a set of vehicle tilt data points and a set of $a_{MB}$ measurements to a database having a record of calibrated track grade and $a_{MB}$ measurements) to be usable for performing a portion or all of the noted processes and/or methods. In one or more embodiments, storage medium 381 also stores information which facilitates performing a portion or all of the noted processes and/or methods. In one or more embodiments, storage medium 381 stores a library 383 of algorithms and sensor configuration information as disclosed herein.

System 380 includes I/O interface 385. I/O interface 385 is coupled to external circuitry. In one or more embodiments, I/O interface 385 includes a keyboard, keypad, mouse, trackball, trackpad, touchscreen, and/or cursor direction keys for communicating information and commands to hardware processor 386.

System 380 also includes network interface 387 coupled to hardware processor 386. Network interface 387 allows EDA system 380 to communicate with network 388, to which one or more other computer systems are connected. Network interface 387 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 380. System 380 is configured to receive information through I/O interface 385. The information received through I/O interface 385 includes one or more of instructions, data, sensor data, sensor calibration values stored in a storage medium, and/or other parameters for processing by hardware processor 386. The information is transferred to hardware processor 386 via bus 389. System 380 is configured to receive information related to a UI through I/O interface 385. The information is stored in computer-readable medium 381 as user interface (UI) 384.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of rail vehicle. In some embodiments, a portion or all of the noted processes and/or methods is implemented as a software application that is used by system 380. In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 4:
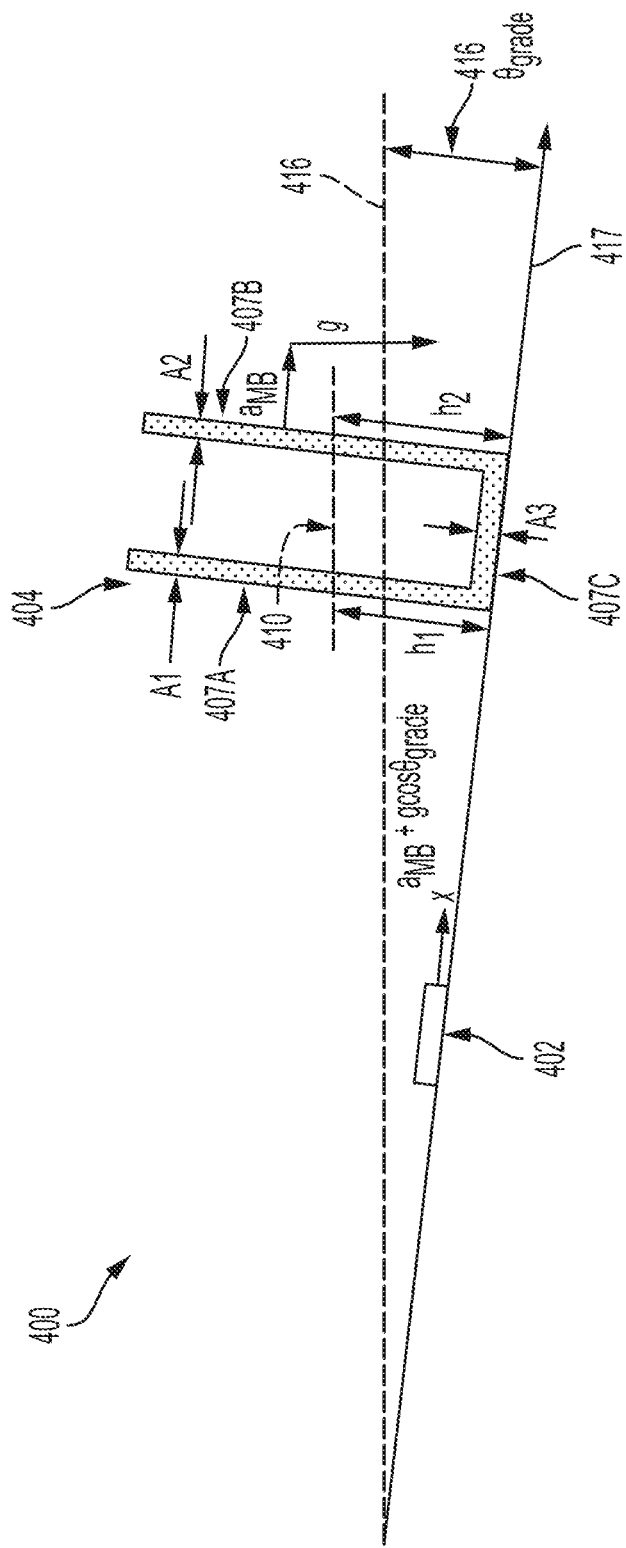
FIG. 4 is a side view of a position-tracking system, in accordance with some embodiments.

FIG. 4 is a side view of a position-tracking system 400, in accordance with some embodiments. Position-tracking system includes an accelerometer component 402 and a liquid-capacitive inclinometer sensor (LCIS) component 404. Accelerometer component 402 is a single-axis accelerometer aligned along the principal axis 417 of a vehicle (not shown). The LCIS component 404 is a "U"-shaped LCIS with a first branch 407A, a second branch 407B, and a bottom branch 407C connecting first branch 407A to second branch 407B.

The accelerometer component 402 and the "U"-shaped LCIS component 404 are mounted on any surface aligned with the principal axis 417, such as the vehicle's bogie or on a surface that is free of suspension (e.g., the principal axis 417 aligns with the rails, tracks or road the vehicle is moving on and is not influenced by a vehicle suspension system). The accelerometer component measures the acceleration due to motoring and braking ($a_{MB}$) and the gravity (g) component along its primary axis as follows:

$$a_x = g \sin \theta_{grade} - a_{MB} \qquad \text{Equation (5)},$$

where $\theta_{grade}$ is the grade angle or slope of tracks on which a vehicle is positioned. Reference line 416 is a horizontal reference line for the LCIS component 404, and a fluid level 410 is parallel to the horizontal reference line 416 when the vehicle is at rest, moving at a constant velocity, and/or level. Fluid level 410 is not parallel to the horizontal reference line 416 when the vehicle is at an angle, or accelerating.

In some embodiments, the LCIS component is sealed to mitigate the influence of static atmospheric pressure and/or dynamic air pressure, and filled with a viscous liquid which has specific weight ç. Fluid viscosity is adjusted to adjust for the effect of transient acceleration and periodical stimulus (such as vibration) on the vehicle.

In some embodiments, the LCIS component has a first branch and a second branch which have circular cross-sections. In some embodiments, the LCIS component has cross-sections which are ellipsoidal. A1 is the cross-sectional area of the first branch 407A of the "U"-shaped LCIS component, and A2 is the cross-sectional area of the second branch 407B, and A3 is the cross section of the bottom branch (or, bridge) 407C connecting the first and second branch together.

L is the LCIS' s width. The bottom branch is any shape configured to allow fluid to flow between the first branch and the second branch of the LCIS component. $h_1$ is branch height of "U"-shaped LCIS first branch average liquid height and $h_2$ is the average liquid height in the second branch of the "U"-shaped LCIS. The diameter of the branches is small with respect to the liquid height when $\theta_{grade} = 0°$. For example, if $h_1 = h_2 = \sim 15$ mm, then typical cross sections will be A1=A2=10 mm$^2$, and the branch diameter is about 4 mm. Other dimensions are within the scope of the present disclosure. The dimensions provided above are for a non-limiting embodiment typical of commercially-available LCIS components.

In a rail operation condition where $a_{MB}$ is not observed (e.g., the vehicle is level and at rest, or moving at constant velocity), the liquid in both branches is level with respect to a horizontal reference line extending through the LCIS component. In a rail operation where $a_{MB}$ is observed, the liquid in each branch has a different height with respect to the hypothetical horizontal reference line extending through the LCIS component. A tilted top surface of the fluid in the lower portion of the LCIS component (or, LCIS unit) is indicative of a non-zero acceleration vector due to motoring or braking for the vehicle.

The pressure in each branches of the "U"-shaped LCIS is in equilibrium, taking into account the influence of the gravity (g) and the acceleration due to motoring and braking ($a_{MB}$) as shown in Equation (6):

$$h_1 \varsigma g \cos \theta_{grade} + L\varsigma(g \sin \theta_{grade} - a_{MB}) = h_2 \varsigma g \cos \theta_{grade} \qquad \text{Equation (6)}$$

Solving Equation (2) for $\cos \theta_{grade}$ yields:

$$\cos \theta_{grade} = L(g \sin \theta_{grade} - a_{MB})/(g(h_2 - h_1)) \qquad \text{Equation (7)}$$

Then using the single axis accelerometer measurement as depicted in Equation (5) above yields.

$$\cos \theta_{grade} = L a_x / (g(h_2 - h_1)) \qquad \text{Equation (8)}$$

$$\theta_{grade} = \cos^{-1}(L a_x / (g(h_2 - h_1))) \qquad \text{Equation (9)}$$

Upon determining $\theta_{grade}$, the acceleration due to motoring and braking ($a_{MB}$) is determined according to one of Equation (10) and Equation (11), as provided below:

$$a_{MB} = g \sin \theta_{grade} - a_x \qquad \text{Equation (10)},$$

$$\text{and } a_{MB} = g(\sin \theta_{grade} - ((h_2 - h_1) \cos \theta_{grade}/L)) \qquad \text{Equation (11)}.$$

The acceleration measured by a single axis accelerometer ($a_x$) may be influenced by noise and/or vibrations. To achieve accurate results, the noise and the influence of vibrations on the single axis accelerometer measurements are removed by filtering the signal from the accelerometer component of the system architecture.

Pairing together the single axis accelerometer and the "U"-shaped LCIS is a method to determine both the grade and the acceleration due to motoring and braking.

Figure 5:
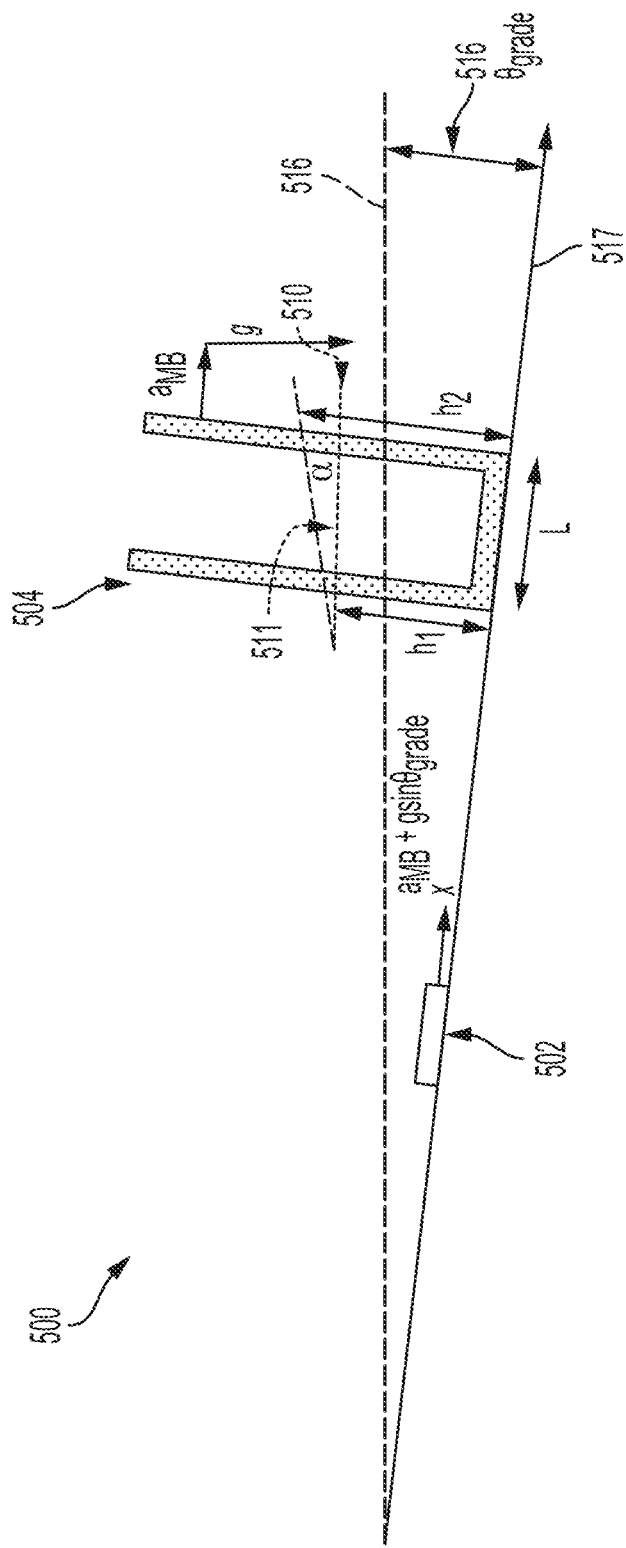
FIG. 5 is a side view of a position-tracking system, in accordance with some embodiments.

FIG. 5 is a side view of a position-tracking system 500, in accordance with some embodiments. Elements of position tracking system 500 which have a similar description and/or function as elements of position tracking-system 400 of FIG. 4 have a same identifying numeral, incremented by 100. Differences between position-tracking system 500 and position tracking system 400 are presented below.

The single axis accelerometer 502 and the LCIS unit 504 are mounted on any surface aligned with the axis of motion such as the vehicle's bogie or on a surface that is car body suspension free; e.g., the primary axis aligns with the rails, tracks or road the vehicle is moving on and is not influenced by the vehicle suspension system. The single axis accelerometer measures the acceleration due to motoring and braking ($a_{MB}$) and the gravity component along its primary axis as depicted at Equation (5) above.

The LCIS is sealed (to mitigate the influence of static atmospheric pressure and/or dynamic air pressure) and filled with a viscous liquid which has specific weight ç. Viscosity is required to minimize the effect of transients and periodical stimulus (such as vibration) on the system.

The LCIS cross section (A1) may be circular or any other shape. L is the LCIS's width. $h_1$ is the liquid height at the LCIS's left side and $h_2$ is the liquid height at the LCIS's right side.

If no acceleration due to motoring and braking is observed, the liquid in the LCIS will be leveled. Then, $h_2$ can be expressed as a function of $h_1$ and $\theta_{grade}$ as depicted at the Equation below.

$$h_2 = h_1 + L_1 tg \theta_{grade} \qquad \text{Equation (12)}$$

In an embodiment where acceleration due to motoring and braking is observed, then the liquid in the LCIS is not level with the bottom of the LCIS unit (see reference line 517) or with horizontal reference line 516, with top surface 510 offset due to the combined acceleration vectors for gravity and the acceleration due to motoring and braking. The liquid slope 511, relative to the LCIS, can be expressed as depicted in Equation (13):

$$tg\alpha=(g\sin\theta_{grade}-a_{MB})/g\cos\theta_{grade}=(h_2-h_1)/L \quad \text{Equation (13)}$$

Using Equation (5) above the grade can be determined as described in Equations (8) and (9).

Upon determining $\theta_{grade}$, the acceleration due to motoring and braking ($a_{MB}$) is determined according to one of Equation (10) and by Equation (11).

In some embodiments, acceleration measured by a single axis accelerometer ($a_x$) is influenced by noise and/or vibrations. Accelerometer signals are filtered in some embodiments in order to reduce or eliminate the influence of noise or vibration on measurements of acceleration by the vehicle. Combining a single axis accelerometer and a LCIS allows a position-tracking computer system to determine both the grade and the acceleration due to motoring and braking.

Figure 6:
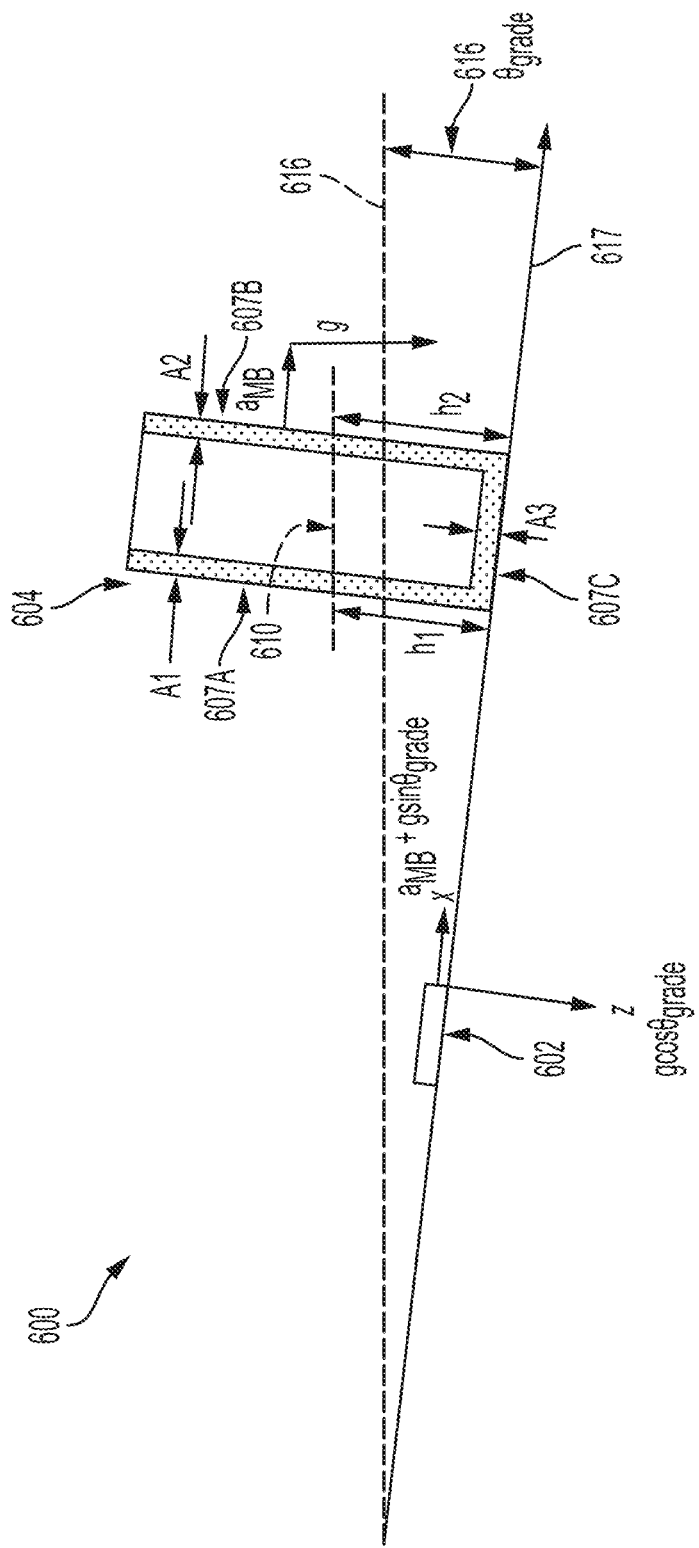
FIG. 6 is a side view of a position-tracking system, in accordance with some embodiments.

FIG. 6 is a side view of a position-tracking system 600, in accordance with some embodiments. Components of position-tracking system 600 which have a similar description and function as elements of position tracking system 400, described above, have a same identifying numeral, incremented by 200. A description of differences between position-tracking system 600 and position-tracking system 400 follows. Position-tracking system 600 employs an accelerometer component 602 (a dual-axis accelerometer) to measure acceleration along the vehicle's primary axis ($a_x$) to determine the grade and acceleration due to motoring and braking. The acceleration measured perpendicular to the vehicle's primary axis ($a_z$) is used for consistency check using Equation (3) and Equation (9) as depicted in the Equation below.

$$a_z/g=La_x/(g(h_2-h_1)) \quad \text{Equation (14)}$$

Therefore, the perpendicular (e.g., vertical) acceleration ($a_z$) measured by the accelerometer matches, within measurement tolerances of the hardware components used, the acceleration measured along the primary axis ($a_x$) compensated by the LCIS's measurements ($h_1$ & $h_2$) as depicted in Equation 15 (a simplification of Equation 14):

$$a_z=La_x/(h_2-h_1)\pm(\text{measurement tolerance}) \quad \text{Equation (15).}$$

Measurement tolerances for acceleration along a principal axis of a vehicle, or perpendicular to a principal axis range from about 0.01 meters/second$^2$ (m/s$^2$) to about 0.05 m/s$^2$, according to some embodiments. The tolerances of measuring acceleration are a function of the accuracy with which an LCIS unit of an LCIS component measures the height of the liquid in a lower portion of the LCIS unit, and according to the speed with which height measurements are made by an LCIS unit. Further, accuracy and numerical granularity (especially for digital accelerometers) of accelerometers and LCIS units are related to the accuracy of measuring acceleration.

Figure 7:
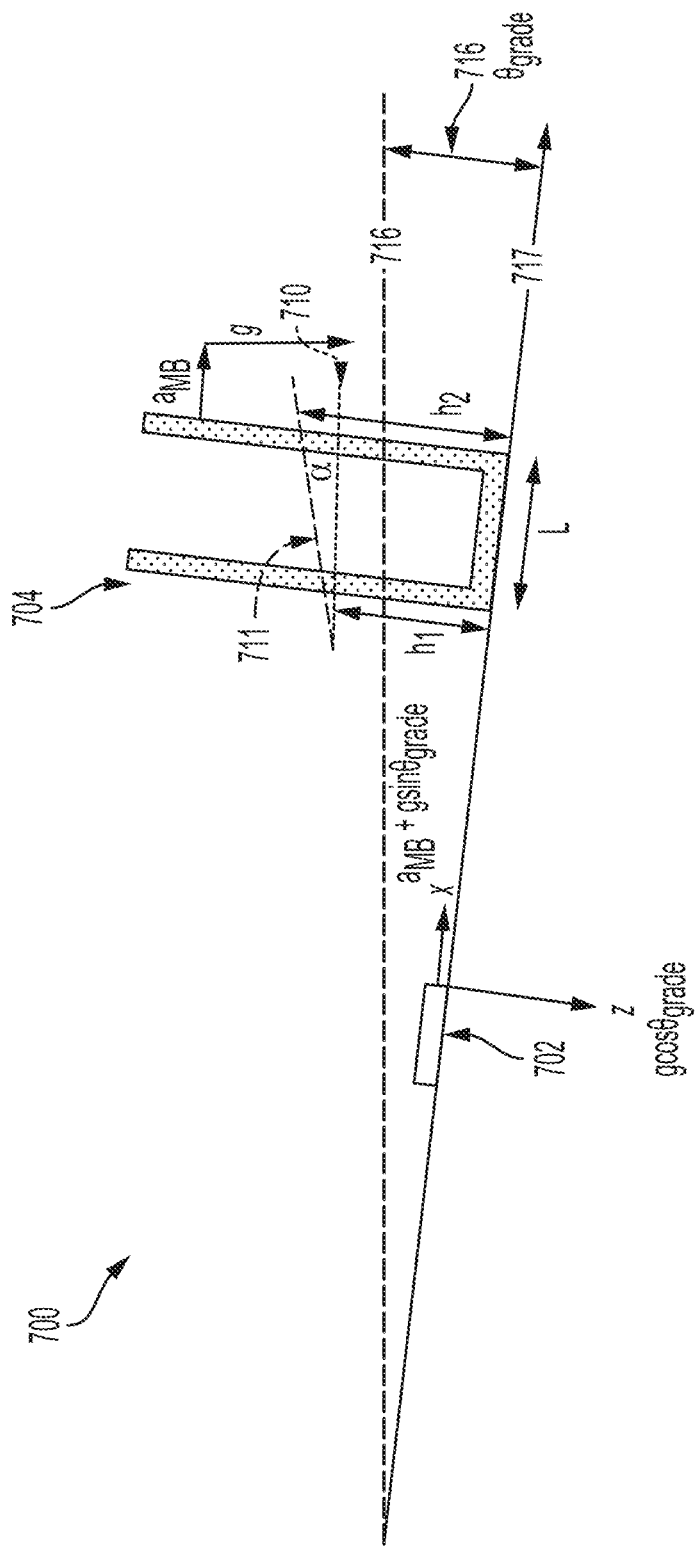
FIG. 7 is a side view of a position-tracking system, in accordance with some embodiments.

FIG. 7 is a side view of a position-tracking system 700, in accordance with some embodiments. Components of position-tracking system 700 which have a similar description and function as elements of position tracking system 500, described above, have a same identifying numeral, incremented by 200. A description of differences between position-tracking system 700 and position-tracking system 500 follows. Position-tracking system 700 employs an accelerometer component 702 (a dual-axis accelerometer) to measure acceleration along the vehicle's primary axis ($a_x$) to determine the grade and acceleration due to motoring and braking. The acceleration measured perpendicular to the vehicle's primary axis ($a_z$) is used for consistency check using Equation (3) and Equation (9) as depicted in Equations (14) to (15) above.

FIGS. 8A-8B are side views of a position-tracking system, in accordance with some embodiments. FIG. 8A is a side view of the position-tracking system 800, under rail operation conditions wherein no acceleration is applied to the vehicle whereon the position-tracking system 800 is mounted. Heights $h_1$ and $h_2$ are heights of liquid along capacitive sensors of the LCIS for a first LCIS unit 802A. Heights $h_3$ and $h_4$ are heights of liquid along capacitive sensors of the LCIS for a second LCIS unit 802B. First LCIS unit 802A is mounted at an offset angle from second LCIS unit 802B. In position-tracking system 800, the electrodes are aligned along the principal axis (not shown) of the vehicle whereon the position-tracking system is mounted. $\theta_{grade}$ is measured in relation to the bottom surface of first LCIS unit 802A, and the bottom of second LCIS unit 802B is offset by an offset angle from the bottom surface of first LCIS unit 802A. Thus, for a fluid 804 in first LCIS unit 802A, the surface angle $\alpha_1$ of the fluid surface 806 is equal to the grade: $\alpha_1=\theta_{grade}$. For a fluid 808 in second LCIS unit 802B, the surface angle $\alpha_2$ of the fluid surface 810 is equal to the grade plus the offset angle: $\alpha_2=\theta_{grade}+\beta$.

In some embodiments, the LCIS units are sealed (to mitigate the influence of static atmospheric pressure and/or dynamic air pressure) and filled with a viscous liquid which has specific weight ç. Viscosity is adjusted to moderate the effect of transients and periodic stimulus (such as vibration) on the position-tracking system.

The LCIS unit's cross section is circular, or any other shape which still allows fluid motion along the walls of the LCIS unit. $A_1$ is the cross section of the first LCIS and $A_2$ is the cross section of the second LCIS. $L_1$ is the first LCIS width and $L_2$ is the second LCIS width. $h_1$ is the liquid height at the left side of the first LCIS, $h_2$ is the liquid height at the right side of the first LCIS, $h_3$ is the liquid height at the left side of the second LCIS and $h_4$ is the liquid height at the right side of the second LCIS.

Under rail operation conditions where no acceleration due to motoring and braking is observed, the liquid in both LCIS units are level with a horizontal reference line (not shown) extending through the LCIS units. Then $h_2$ can be expressed as a function of $h_1$ and $\theta_{grade}$ and $h_4$ can be expressed as a function of $h_3$ and $\theta_{grade}$ as depicted at the Equations below.

$$h_2=h_1+L_1tg\theta_{grade} \quad \text{Equation (16)}$$

$$h_4=h_3+L_2tg(\theta_{grade}+\beta) \quad \text{Equation (17)}$$

FIG. 8B is a side view of the position tracking system 850, under rail operation conditions wherein an acceleration is applied to the vehicle whereon the position tracking system 850 is mounted. Elements of position tracking system 850 which have a same description or function as position tracking system 800 have a same identifying numeral, incremented by 50. Under rail operation conditions where acceleration due to motoring and braking is observed, then the liquid in both LCIS units are not level with the horizontal reference line (not shown), and have an offset angle due to the acceleration due to motion and braking, $a_{MB}$. In first LCIS unit 852A, the fluid surface 856 includes an angular component/offset angle due to $a_{MB}$. In second LCIS unit 852B, the fluid surface 860 includes an angular component/offset angle due to $a_{MB}$. The offset angle between the resultant vector and the gravity vector ($\gamma$) for both LCIS units is depicted at the Equations below.

$$tg\gamma_1=a_{MB}\cos\theta_{grade}/(g+a_{MB}\sin\theta_{grade}) \quad \text{Equation (18)}$$

$$tg\gamma_2=a_{MB}\times\cos(\theta grade+\beta)/(g+a_{MB}\times\sin(\theta_{grade}+\beta)) \quad \text{Equation (19)}$$

The acceleration due to motoring and braking derived from Equations (18) and (19) above is calculated according to Equation (20):

$$a_{MB} = gtg\gamma_1/(\cos\theta_{grade} - tg\gamma_1\sin\theta_{grade}) \quad \text{Equation (20)}$$
$$= gtg\gamma_2/(\cos(\theta_{grade} + \beta) - tg\gamma_2\sin(\theta_{grade} + \beta))$$

The angle between resultant vector and the gravity vector (γ) is derived from the LCIS unit's liquid heights measurements as described in Equations (21) and (22):

$$tg\gamma_1 = (h_2 - h_1)/L_1 \quad \text{Equation (21)}$$

$$\text{and } tg\gamma_2 = (h_4 - h_3)/L_2 \quad \text{Equation (22)}$$

β is a known angle and therefore the grade can be derived based on Equations (20) to (22) as depicted at the Equations (23) and (24), below:

$$tg\theta_{grade} = ((\cos\beta(h_2-h_1)/L_1)-(\sin\beta(h_2-h_1)(h_4-h_3)/L_1L_2)-((h_4-h_3)/L_2))/((\cos\beta(h_2-h_1)(h_4-h_3)/L_1L_2)-((h_2-h_1)(h_4-h_3)/L_1L_2)+(\sin\beta(h_2-h_1)/L_1)) \quad \text{Equation (23)}$$

$$\theta_{grade} = tg-1((\cos\beta(h_2-h_1)/L_1)-(\sin\beta(h_2-h_1)(h_4-h_3)/L_1L_2)-((h_4-h_3)/L_2))/((\cos\beta(h_2-h_1)(h_4-h_3)/L_1L_2)-((h_2-h_1)(h_4-h_3)/L_1L_2)+(\sin\beta(h_2-h_1)/L_1)) \quad \text{Equation (24)}$$

Then $a_{MB}$ is derived based on Equations (20) and (24) as follows:

$$a_{MB} = g(h_2-h_1)/(L_1\cos\theta_{grade}-(h_2-h_1)\sin\theta_{grade}) \quad \text{Equation (25)},$$

$$\text{and } a_{MB} = g(h_4-h_3)/(L_2\cos(\theta_{grade}+\beta)-(h_4-h_3)\sin(\theta_{grade}+\beta)) \quad \text{Equation (26)}$$

Using the LCIS units equipped with electrodes measuring the capacitance will provide the height measurements to a microcontroller connected to the LCIS units. The microcontroller has the motion parameters in its database which are used together with the measured $h_1$, $h_2$, $h_3$, and $h_4$ to calculate $\theta_{grade}$ and $a_{MB}$ according to Equations (24) to (26) above.

To implement measurement of $a_{MB}$ with position-tracking systems as described in FIGS. 4 and 6, above, the LCIS component is configured to measure $h_1$ and $h_2$ at different sides of the inclinometer body along the principal axis of motion of the vehicle.

One method to measure the liquid heights in the LCIS is capacitive measurements of the liquid top surface contact points with the LCIS. LCIS measurements are well characterized and have relatively slow (typically 100 ms to 200 ms) response times. LCIS measurements of $\theta_{grade}$ are suitable for the present disclosure because vehicles, especially rail vehicles, have relatively slow velocity changes of the vehicle along the principal axis, and 100 ms to 200 ms time resolution is sufficiently fast to capture the changes in velocity that a vehicle experiences, or which reflect changes in the grade of the surface over which a vehicle travels. In some embodiments, the response time of an LCIS unit is tuned by changing the liquid viscosity. The smaller the cross section/opening is the response time will be slower, and the larger the cross section/opening is the response time will be quicker because the liquid flow rate will be greater. In some embodiments, the noise-suppression characteristics of an LCIS unit are modified by changing the shape of the LCIS unit body, or of the branches which contain fluid. In some embodiments, other measurement techniques are used to measure the liquid level at each LCIS branch, including ultrasonic measurements, acoustic (audible) measurements, laser-based distance measurements, spectrophotometric measurements, and so forth.

Figure 9:
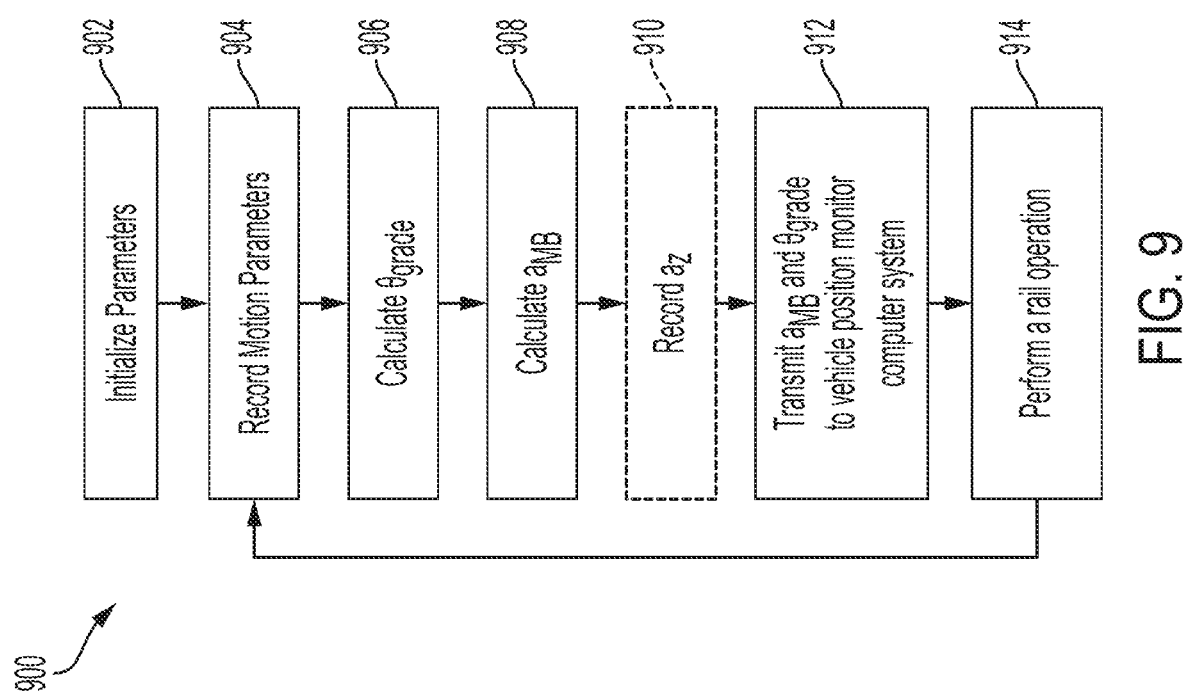
FIG. 9 is a flow diagram of a method of determining a rail vehicle position, in accordance with some embodiments.

FIG. 9 is a flow diagram of a method of determining a rail vehicle position, in accordance with some embodiments. In an operation 902, the position-tracking system computer of a vehicle performs an initialization step to initialize the motion-determining parameters associated with the position-determining system of the vehicle. In some embodiments, the parameters include lengths L of an LCIS unit, ranges for $h_1$ and $h_2$ associated with an LCIS unit, and calibration values for accelerometers, offset angles between LCIS units for position-determining systems having dual-LCIS units installed thereon, and so forth.

In an operation 904, the motion parameters of the position-sensing system are measured. In some embodiments, the motion parameters include $h_1$ and $h_2$ for an LCIS unit, $h_3$ and $h_4$ for a second LCIS unit, and acceleration along a principal axis ($a_x$) of the vehicle.

In an operation 906, the position-tracking system performs a calculation as described above to determine $\theta_{grade}$. In an operation 908, the position-tracking system performs a calculation as described above to determine $a_{MB}$.

In an optional operation 910, the position-tracking system records vertical acceleration ($a_z$) perpendicular to the motion along the principal axis, and so forth, as part of the motion parameters for tracking vehicle position. Operation 910 is not performed with position-tracking systems which have no accelerometers, but only LCIS units located therein.

In an operation 912, the position-tracking system transmits the values of $a_{MB}$ and $\theta_{grade}$ to a vehicle position monitor computer system, or some other computer system, to regulate vehicle position or verify movement authority is appropriate for the vehicle without causing a collision. In some embodiments, operation 912 includes steps associated with comparing $\theta_{grade}$ and $a_{MB}$ to values of grade along a set of tracks, or a guideway, or a road, which have been stored in a computer storage medium in the vehicle position monitor computer system to determine, based on the current and historical values of $\theta_{grade}$ and $a_{MB}$, the actual or current position of a vehicle along a set of tracks. Method 900 then continues to operation 904, wherein additional motion parameters are collected for analysis as described herein.

Method 900 includes an operation 914, in which a vehicle performs a rail operation according to the values of $a_{MB}$ and\or $\theta_{grade}$ transmitted to the vehicle position monitor computer system, or to some other computer system. In some embodiments, the rail operation is a performing a communication operation with a traffic controller computer system to request movement authority and, upon receiving movement authority, initiating vehicle movement. In some embodiments, the rail operation includes a communication operation wherein the vehicle receives, based on the values of $a_{MB}$ and\or $\theta_{grade}$ transmitted to the vehicle position monitor computer system, or to some other computer system, or the traffic controller computer system, a revocation or movement authority or a collision warning, and the vehicle halts movement to avoid a collision. In some embodiments, the rail operation includes a safety operation to detect the position of another vehicle near the vehicle of interest. In some embodiments, the safety operation includes starting or stopping vehicle motion according to the values of $a_{MB}$ and $\theta_{grade}$ determined by the vehicle. In some embodiments, the rail operation is a safety operation wherein the actual or current position of a vehicle of interest along a set of tracks, or a guideway, or a road, is compared to positions of other vehicles, determining whether the other vehicle(s) are within a warning distance (collision threshold distance) of the vehicle of interest, and sounding a warning or halting vehicle movement to avoid a collision. In some embodiments, the rail operation is a safety operation wherein the vehicle of interest, upon determining a position based on the measured values of $\theta_{grade}$ and $a_{MB}$, and detecting, based on positions of other vehicles within a warning distance or collision threshold distance, an imminent collision or traffic congestion, transmits to other vehicles (or to a traffic controller computer system) a warning of imminent collision or traffic congestion before halting motion of the vehicle of interest.

Figure 10:
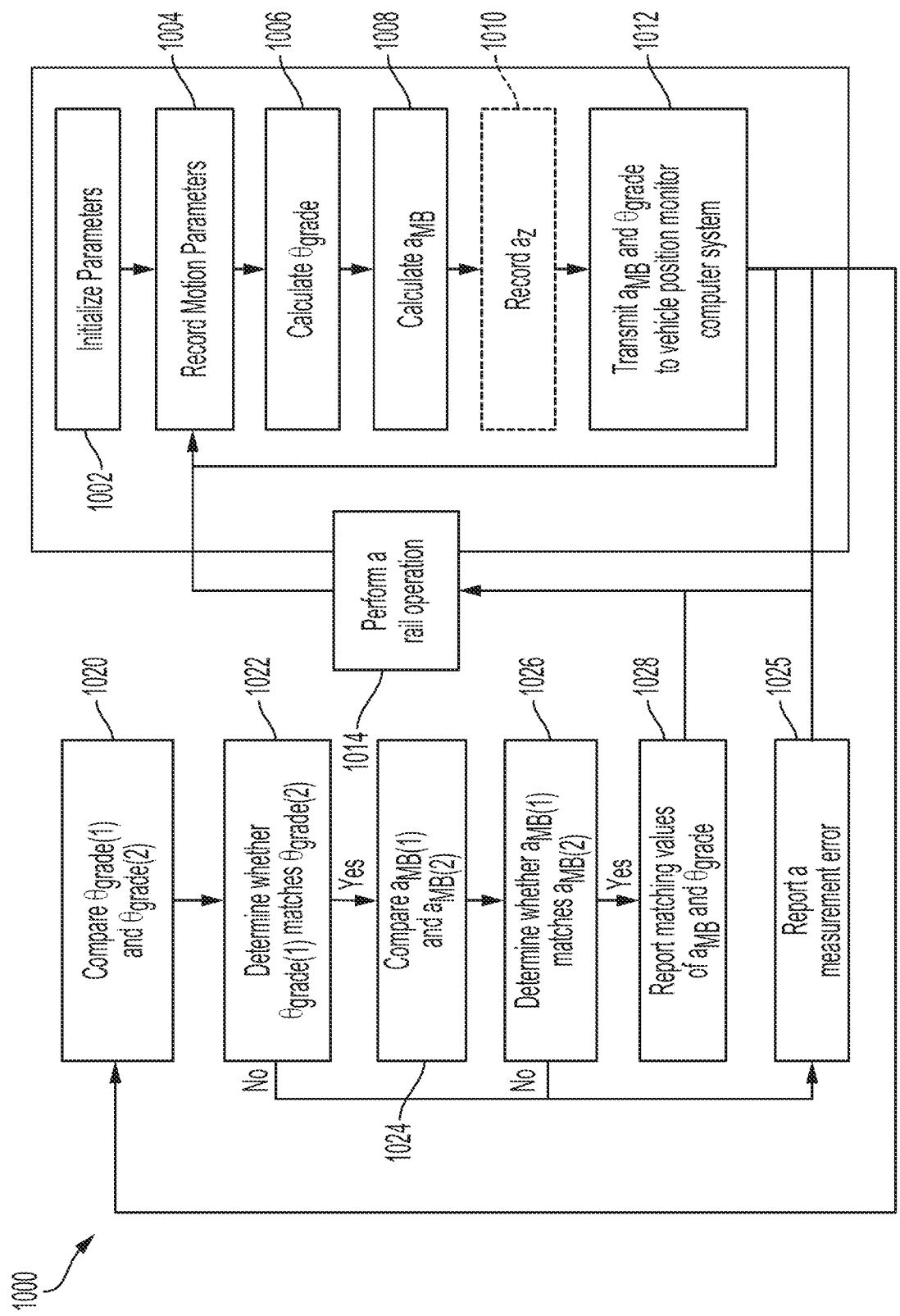
FIG. 10 is a flow diagram of a method of determining a rail vehicle position, in accordance with some embodiments.

FIG. 10 is a flow diagram of a method of determining a rail vehicle position, in accordance with some embodiments.

In an operation 1002, the position-tracking system computer of a vehicle performs an initialization step to initialize the motion-determining parameters associated with the position-determining system of the vehicle. In some embodiments, the parameters include lengths L of an LCIS unit, ranges for $h_1$ and $h_2$ associated with an LCIS unit, and calibration values for accelerometers, offset angles between LCIS units for position-determining systems having dual-LCIS units installed thereon, and so forth.

In an operation 1004, the motion parameters of the position-sensing system are measured. In some embodiments, the motion parameters include $h_1$ and $h_2$ for an LCIS unit, $h_3$ and $h_4$ for a second LCIS unit, and acceleration along a principal axis ($a_x$) of the vehicle.

In an operation 1006, the position-tracking system performs a calculation as described above to determine $\theta_{grade}$. In an operation 1008, the position-tracking system performs a calculation as described above to determine $a_{MB}$.

In an optional operation 1010, the position-tracking system records vertical acceleration ($a_z$) perpendicular to the motion along the principal axis, and so forth, as part of the motion parameters for tracking vehicle position. Operation 910 is not performed with position-tracking systems which have no accelerometers, but only LCIS units located therein.

In an operation 1012, the position-tracking system transmits the values of $a_{MB}$ and $\theta_{grade}$ to a vehicle position monitor computer system, or some other computer system, to regulate vehicle position or verify movement authority is appropriate for the vehicle without causing a collision. Thus, a value of $a_{MB(1)}$ and $a_{MB(2)}$, and $\theta_{grade(1)}$ and $\theta_{grade(2)}$ for each position-tracking system installed on a vehicle is reported to the vehicle position monitor computer system.

Method 1000 includes an operation 1014, wherein the vehicle of interest performs a rail operation and/or a safety operation. Rail operations and/or safety operations include steps associated with: communicating position information of the vehicle of interest to other vehicles, receiving position information from other vehicles and comparing the positions, determining whether the vehicle of interest and the other vehicles are on a same track, determining whether the vehicle of interest and the other vehicle(s) are within a warning distance (or, a collision warning threshold distance), transmitting position information for the vehicle of interest to other vehicles on the same track, halting motion of the vehicle of interest based on a position of another vehicle on the same track as the vehicle of interest, requesting movement authority (e.g., from a traffic controller computer system), and receiving movement authority from a traffic controller computer system and initiating motion after receiving movement authority.

In some embodiments, the method continues from operation 1012 to operation 1014 upon determining that the vehicle of interest and another vehicle are on a same track and within a collision warning threshold distance of each other. In some embodiments, the method continues to operation 1020 to perform comparison of $a_{MB}$ and $\theta_{grade}$ values recorded by different position-tracking computer systems in a vehicle of interest prior to performing operation 1014 (in order to have a more accurate position determination prior to performing the rail operation). In some embodiments, upon completing operation 1014, the method continues to operation 1004, to record new motion parameters for the vehicle of interest.

Method 1000 continues to operation 1020, wherein values of $\theta_{grade}$ are compared for each position tracking system (e.g., $\theta_{grade(1)}$ and $\theta_{grade(2)}$) of the vehicle. In an operation 1022, a determination is made as to whether $\theta_{grade(1)}$ and $\theta_{grade(2)}$ match. When no matching occurs, the method continues to operation 1025. When matching occurs, the method continues to operation 1024.

In operation 1024, the values of $a_{MB}$ are compared for each position tracking system (e.g., $a_{MB(1)}$ and $a_{MB(2)}$). In an operation 1026, a determination is made as to whether the values of $a_{MB(1)}$ and $a_{MB(2)}$ match (are within an acceleration matching threshold). The acceleration due to motoring and braking ($a_{MB}$) is deemed to match when both values match within about 0.1 m/sec². The threshold of about 0.1 m/sec² is a function of the hardware accuracy of measuring the acceleration, and/or $\theta_{grade}$, or the heights of fluid on the sides of the LCIS units. In some embodiments, matching thresholds larger than about 0.1 m\sec² are deemed matching due to less accurate measuring equipment. Upon determining that the values of $a_{MB(1)}$ and $a_{MB(2)}$ match, the method continues to operation 1028. In operation 1028, the position tracking system, or the vehicle position monitor computer, reports the value of matching $\theta_{grade}$, and $a_{MB}$, and the method continues to operation 1004. When no matching exists, the method continues to operation 1025. In operation 1025, the position tracking system, or the vehicle position monitor computer system, reports a measurement error and the method continues to operation 1004.

Matching of values verifies that both values match within a certain predefined tolerance typically 0.1°. The acceleration due to motoring and braking ($a_{MB}$) is deemed to match when both values match within about 0.1 m/sec².

In method 1000, the acceleration due to motoring and braking plus the gravity component along the vehicle's primary axis (g $\sin(\theta_{grade})-a_{MB}$) determined by method 900 is compared with the acceleration measured by the single/dual axis accelerometer ($a_x$) with the goal to estimate the influence of vibrations on the single axis accelerometer measurements. The assumption here is that method 900 (e.g., operations analogous to operations 1002-1014 of method 1000) is less sensitive to vibrations because no accelerometer is used. Differences between acceleration measured by accelerometer components and LCIS components are attributed to the influence of vibrations on the acceleration measured by an accelerometer component.

In method 1000, the outputs ($a_{MB}$ & $\theta_{grade}$) of hardware configurations such as position tracking systems having two LCIS units, and no accelerometers (see FIGS. 8A-8B, above) are considered more accurate because no vibration-induced inaccuracy contributes to measurement uncertainty. In position tracking systems having a combination of dual-LCIS-unit position tracking, and accelerometer+single-LCIS-unit position tracking, the outputs from the dual-LCIS-unit position tracking are considered primary values, and the outputs from the accelerometer+single-LCIS-unit position tracking are considered secondary values, or backup values, which are used for error-checking unless the dual-LCIS-unit position tracking system fails (and the accelerometer+single-LCIS-unit position tracking serves as a fallback system).

In all methods, other alternatives for the LCIS units described herein are usable. For example, instead of leaving air on top of the liquid in the LCIS the LCIS is filled with two different liquids with the following properties (see, e.g., FIG. 2A and FIG. 2B): where [1] Liquid 1 specific weight (ç1) is greater than liquid 2 (ç2) specific weight (ç1>ç2). Typically about 25% difference is sufficient (ç1/ç2>1.25), although other differences in specific weight are also suitable for other embodiments not disclosed herein, or [2] Liquid 1 capacitive (Ω1) is different than liquid 2 capacitive (Ω2). Typically by at least 25% (Ω1/Ω2<0.75 or Ω1/Ω2>1.25), although other differences are also suitable for other embodiments not disclosed herein.

In some embodiments, the LCIS has a "closed" "square" or "circle" or "ellipsoid" form LCIS as depicted in, e.g., FIG. 2B. The advantage of such design is reduced sensitivity to vibrations and transients as the two liquids configuration provides a dampening effect, absorbing and/or attenuating vibrations because the upper liquid and the lower liquid act as a "brake" on each other, slowing rapid fluid changes caused by vibration.

According to the present disclosure, the hardware configurations and methods described herein are configured to measure $\theta_{grade}$ and $a_{MB}$ in order to (1) improve vehicle position-tracking functions, and to improve vehicle odometry; (2) provide input for regulating a vehicle auto-pilot control system; (3) measure vehicle vibrations along a vehicle primary axis (using, e.g., a single-axis accelerometer aligned with the vehicle primary axis, (4) provide a redundant and diverse system complementary to the system proposed in U.S. patent application Ser. No. 16/577,315 entitled, "Stationary State Determination, Speed Measurements," filed on Sep. 20, 2019, and incorporated herein by reference in its entirety.

In some embodiments, the subject matter of the present disclosure relates to a system for continuously monitoring the grade of tracks ($\theta_{grade}$) $a_{MB}$ and to detect anomalies or changes with respect to the expected grade and acceleration profiles, where detected changes are associated with vehicle failures or changes in the rail or road over which the vehicle travels; and/or a system and method for surveying a road or set of tracks for a vehicle.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A position-tracking system, comprising:
   a vehicle having a position-tracking computer system and a liquid capacitive inclinometer sensor (LCIS) component mounted to the vehicle having and communicatively connected to the position-tracking computer system, wherein the LCIS component is aligned with a principal axis of the vehicle, wherein the LCIS component includes one or more LCIS units aligned with the principal axis and configured to measure acceleration along the principal axis ($a_x$).

2. The system of claim 1, further comprising an accelerometer component aligned with the principal axis of the vehicle and configured to measure the acceleration along the principal axis ($a_x$), the accelerometer component mounted to the vehicle and communicatively connected to the position-tracking computer system.

3. The system of claim 2, wherein the accelerometer component is further configured to measure acceleration in a direction perpendicular to the principal axis ($a_z$).

4. The system of claim 1, wherein the LCIS component comprises at least two LCIS units aligned with the principal axis and configured to measure the acceleration along the principal axis ($a_x$).

5. The system of claim 4, wherein a first LCIS unit of the at least two LCIS units is mounted at an offset angle (β) from a second LCIS unit of the at least two LCIS units.

6. The system of claim 4, further comprising an accelerometer component aligned with the principal axis of the vehicle and configured to measure the acceleration along the principal axis ($a_x$).

7. A method, comprising:
   recording motion parameters associated with a position-tracking system of a vehicle;
   calculating, based on the recorded motion parameters, a grade ($\theta_{grade}$) in relation to a horizon or a level position;
   calculating, based on the motion parameters and the grade, acceleration due to motoring and braking ($a_{MB}$);
   determining a vehicle position based on the grade and/or the calculated acceleration due to motoring and braking; and
   performing a rail operation based on the determined vehicle position.

8. The method of claim 7, further comprising transmitting $a_{MB}$ and $\theta_{grade}$ to a vehicle position monitor computer system.

9. The method of claim 7, wherein the recording motion parameters associated with the position-tracking system of the vehicle further comprises determining an acceleration along a principal axis ($a_x$).

10. The method of claim 9, wherein the recording motion parameters associated with the position-tracking system of the vehicle further comprises determining an acceleration along an axis perpendicular to the principal axis ($a_z$).

11. The method of claim 10, wherein calculating the grade further comprises calculating an arc-cosine ($\cos^{-1}$) of $a_z/(g)$, where g is an acceleration due to gravity.

12. The method of claim 10, wherein the recording motion parameters further comprises measuring a height of a liquid in an LCIS unit of the position-tracking system of the vehicle at opposite sides of the LCIS, wherein the LCIS is aligned with the principal axis of the vehicle.

13. The method of claim 7, wherein the recording the motion parameters associated with the position-tracking system of the vehicle comprises:
   recording, where the position-tracking system includes a first position-tracking system and a second position-tracking system, and the motion parameters include a first set of motion parameters from the first-position tracking system and a second set of motion parameters from the second position-tracking system.

14. A method, comprising
   recording, for a vehicle having a first position-tracking system and a second position tracking system, a first set of motion parameters from the first position-tracking system and a second set of motion parameters from the second position-tracking system;

calculating a first grade ($\theta_{grade(1)}$) in relation to a horizon or a level position and a first acceleration due to motoring and braking ($a_{MB(1)}$) based on the first set of motion parameters;

calculating a second grade ($\theta_{grade(2)}$) in relation to the horizon or the level position and a second acceleration due to motoring and braking ($a_{MB(2)}$) based on the second set of motion parameters;

determining whether the first grade and the second grade match within a first measurement tolerance; and determining whether the first acceleration due to motoring and braking ($a_{MB(2)}$) match within a second measurement tolerance, determining, in response to determining that $a_{MB(1)}$ and $a_{MB(2)}$ are within a third measurement tolerance; a vehicle position; and performing a rail operation based on the determined vehicle position.

15. The method of claim 14, further comprising reporting a measurement error upon determining that the first grade does not match the second grade.

16. The method of claim 14, further comprising reporting a measurement error upon determining that the first acceleration due to motoring and braking does not match the second acceleration due to motoring and braking.

17. The method of claim 14, further comprising reporting a matching acceleration due to motion and braking, and a matching grade, to a vehicle position monitor computer system.

18. The method of claim 14, wherein determining the first grade and the second grade further comprises recording a first height and a second height of a first liquid in a first liquid capacitive inclinometer sensor (LCIS) unit, and recording a third height and a fourth height of a second liquid in a second LCIS unit, wherein the first LCIS unit and the second LCIS unit are aligned with a principal axis of the vehicle.

19. The method of claim 14, wherein recording motion parameters further comprises measuring acceleration along a principal axis ($a_x$) of the vehicle with a single-axis accelerometer.

20. The method of claim 14, wherein recording motion parameters further comprises measuring acceleration along a principal axis ($a_x$) of the vehicle, and acceleration perpendicular to the principal axis of the vehicle ($a_z$) with a dual-axis accelerometer.

* * * * *